(12) United States Patent
Fujiwara

(10) Patent No.: US 10,686,187 B2
(45) Date of Patent: Jun. 16, 2020

(54) SLURRY FOR ELECTRODE MATERIAL, METHOD FOR PRODUCING SLURRY FOR ELECTRODE MATERIAL, NEGATIVE ELECTRODE, BATTERY, AND POLYIMIDE-COATED ACTIVE MATERIAL PARTICLES

(71) Applicant: I.S.T Corporation, Otsu-shi, Shiga (JP)

(72) Inventor: Kae Fujiwara, Otsu (JP)

(73) Assignee: I.S.T CORPORATION, Shiga (JP)

( * ) Notice: Subject to any disclaimer, the term of this patent is extended or adjusted under 35 U.S.C. 154(b) by 120 days.

(21) Appl. No.: 15/552,084

(22) PCT Filed: Feb. 17, 2016

(86) PCT No.: PCT/JP2016/054516
§ 371 (c)(1),
(2) Date: Aug. 18, 2017

(87) PCT Pub. No.: WO2016/136543
PCT Pub. Date: Sep. 1, 2016

(65) Prior Publication Data
US 2018/0254476 A1  Sep. 6, 2018

(30) Foreign Application Priority Data
Feb. 26, 2015 (JP) ................................. 2015-036094

(51) Int. Cl.
*H01M 4/36* (2006.01)
*H01M 4/62* (2006.01)
(Continued)

(52) U.S. Cl.
CPC ............ *H01M 4/366* (2013.01); *C08G 73/10* (2013.01); *H01M 4/13* (2013.01); *H01M 4/364* (2013.01);
(Continued)

(58) Field of Classification Search
None
See application file for complete search history.

(56) References Cited

U.S. PATENT DOCUMENTS 3,533,997 A  10/1970  Angelo
4,759,987 A   7/1988  Mizobe et al.
(Continued)

FOREIGN PATENT DOCUMENTS

CN  101098026 A  1/2008
CN  102201595 A  9/2011
(Continued)

OTHER PUBLICATIONS

JP-2013235685-A English machine translation (Year: 2013).*
(Continued)

*Primary Examiner* — Scott J. Chmielecki
(74) *Attorney, Agent, or Firm* — Hamre, Schumann, Mueller & Larson, P.C.

(57) ABSTRACT

A polyimide-coated active material particle (21) of the present invention includes an active material particle (23) and a polyimide layer (24) derived from a monomeric polyimide precursor and coated on the active material particle (23). A negative electrode (200) of the present invention includes a current collector (30) and an active material layer (20) including the negative electrode active material particle (21) coated with the polyimide layer (24) derived from a monomeric polyimide precursor, and an aqueous binder (22). With the polyimide-coated active material particle of the present invention, it is possible to suppress the amount of organic solvent used and improve the charge-discharge cycle of the electrode.

20 Claims, 5 Drawing Sheets

(51) Int. Cl.
*H01M 4/13* (2010.01)
*C08G 73/10* (2006.01)
*H01M 4/587* (2010.01)
*H01M 4/38* (2006.01)
*H01M 4/48* (2010.01)
*H01M 10/0525* (2010.01)
*H01M 10/0569* (2010.01)
*H01M 4/02* (2006.01)

(52) U.S. Cl.
CPC .......... *H01M 4/386* (2013.01); *H01M 4/483* (2013.01); *H01M 4/587* (2013.01); *H01M 4/62* (2013.01); *H01M 4/622* (2013.01); *H01M 4/625* (2013.01); *H01M 10/0525* (2013.01); *H01M 10/0569* (2013.01); *H01M 2004/027* (2013.01); *H01M 2300/0025* (2013.01)

(56) References Cited

U.S. PATENT DOCUMENTS

| | | | |
|---|---|---|---|
| 7,771,518 | B2 | 8/2010 | Yoshinaga et al. |
| 8,771,873 | B2 | 7/2014 | Fukui et al. |
| 2005/0244711 | A1 | 11/2005 | Nakamura |
| 2006/0099506 | A1 | 5/2006 | Krause et al. |
| 2008/0124631 | A1 | 5/2008 | Fukui et al. |
| 2008/0193831 | A1 | 8/2008 | Mah et al. |
| 2009/0246632 | A1 | 10/2009 | Fukui et al. |
| 2009/0297945 | A1* | 12/2009 | Hwang .............. H01M 4/133 429/207 |
| 2009/0311519 | A1 | 12/2009 | Nagata et al. |
| 2012/0270103 | A1 | 10/2012 | Lee et al. |
| 2013/0101897 | A1 | 4/2013 | Fukui et al. |
| 2013/0260020 | A1 | 10/2013 | Tomikawa et al. |
| 2014/0155508 | A1* | 6/2014 | Aoki .............. C08J 9/24 521/154 |
| 2014/0322606 | A1* | 10/2014 | Lee .............. H01M 4/366 429/222 |
| 2014/0377616 | A1* | 12/2014 | Kwon .............. H01M 10/0565 429/94 |
| 2014/0377617 | A1* | 12/2014 | Kwon .............. H01M 4/626 429/94 |
| 2015/0004462 | A1* | 1/2015 | Huang .............. H01M 2/0207 429/127 |
| 2015/0221936 | A1* | 8/2015 | Huang .............. H01M 4/134 429/217 |
| 2016/0072123 | A1* | 3/2016 | Lang .............. H01M 4/139 429/217 |
| 2017/0162864 | A1* | 6/2017 | Peled .............. H01M 4/405 |
| 2017/0170473 | A1* | 6/2017 | Peled .............. H01M 4/134 |
| 2017/0250448 | A1* | 8/2017 | Kwon .............. H01M 2/02 |
| 2018/0034108 | A1* | 2/2018 | Uhm .............. H01M 4/75 |

FOREIGN PATENT DOCUMENTS

| | | |
|---|---|---|
| CN | 104124414 A | 10/2014 |
| JP | S59204609 A | 11/1984 |
| JP | 2000007783 A | 1/2000 |
| JP | 2000273172 A | 10/2000 |
| JP | 2000281671 A | 10/2000 |
| JP | 2001174996 A | 6/2001 |
| JP | 2001194796 A | 7/2001 |
| JP | 2006198589 A | 8/2006 |
| JP | 2011040326 A | 2/2011 |
| JP | 2012204181 A | 10/2012 |
| JP | 2012209219 A | 10/2012 |
| JP | 2013235683 A | 11/2013 |
| JP | 2013235684 A | 11/2013 |
| JP | 2013235685 A | 11/2013 |
| JP | 2013235685 A * | 11/2013 |
| JP | 2014103052 A | 6/2014 |
| JP | 2014150068 A | 8/2014 |
| JP | 5674964 B2 | 2/2015 |
| KR | 10-2013-0079638 | 7/2013 |
| WO | 2007094240 A1 | 8/2007 |
| WO | 2012081534 A1 | 6/2012 |

OTHER PUBLICATIONS

International Search Report (English and Japanese) and Written Opinion of international application No. PCT/JP2016/054516, dated May 10, 2016, 8 pages provided.

Korean Office Action issued in corresponding Korean Application No. 10- 2017-7024027 dated Feb. 27, 2018 (11 pages).

The extended European search report issued in European Application No. 16755290.0, dated Oct. 1, 2018.

Deligöz et al.: "Preparation of Sulfonated Copolyimides Containing Aliphatic Linkages as Proton-Exchange Membranes for Fuel Cell Applications"; Journal of Applied Polymer Sciences, vol. 110, No. 2, Oct. 2008, pp. 1216-1224.

Pak et al.: "Ionic transport measurements of LiCF3SO3 doped polyimide-diaminobenzenesulfonic acid copolymer"; Solid State Ionics, North-Holland pub. Company, Amsterdam, NL, vol. 67, No. 1-2, Dec. 1993, pp. 165-169.

Uemura et al.: "Characterization of Positive-type Photosensitive Polyimide Films Formed by Electrodeposition coating"; Journal of Photopolymer Science and Technology, vol. 16, No. 2, Jan. 2003, pp. 279-284.

Uemura et al.: "Characterization of Positive-type Photosensitive Polyimide Films Formed by Electrodeposition Coating"; Journal of Photopolymer Science and Technology, vol. 17, No. 2, Jan. 2004, pp. 269-280.

Korean Office Action dated Dec. 16, 2014; Korean Application No. 10-2013-7026836 corresponding to U.S. Appl. Nos. 14/006,258 and 15/813,734 together with English translation (19 pages).

Chinese Office Action dated Jul. 28, 2014; Chinese Application No. 201280014529.8 corresponding to U.S. Appl. Nos. 14/006,258 and 15/81,3734 together with English translation (10 pages).

The extended European search report dated Oct. 16, 2014; European Patent Application No. 12765057.0 corresponding to U.S. Appl. Nos. 14/006,258 and 15/813,734 (9 pages).

U.S. Appl. No. 15/813,734, filed Nov. 15, 2017, US 2018-0076461 A1.

* cited by examiner (a)

(b)

(a)

(b)

(a)

(b)

SLURRY FOR ELECTRODE MATERIAL, METHOD FOR PRODUCING SLURRY FOR ELECTRODE MATERIAL, NEGATIVE ELECTRODE, BATTERY, AND POLYIMIDE-COATED ACTIVE MATERIAL PARTICLES

TECHNICAL FIELD

The present invention relates to a polyimide-coated active material particle, a slurry for an electrode material, an electrode (for example, a negative electrode), and a battery. The present invention also relates to a method for producing polyimide-coated active material particle.

BACKGROUND ART

A negative electrode constituting a lithium secondary battery includes active material particles alloyed with lithium, such as silicon particles. The active material particles alloyed with lithium repeatedly expand and shrink following repeated occlusion and release of lithium ions caused by charging and discharging. A problem caused by the repeated expansion and shrinkage of the active material particles is that active material particles themselves and a binder contained in the active material layer are fractured and a charge-discharge cycle characteristic is deteriorated.

Accordingly, it has been suggested to use a polyimide resin as a binder contained in the active material layer, as shown in Patent Document 1.

CITATION LIST

Patent Literature

[PTL 1] Japanese Patent Application Publication No. 2012-204181

SUMMARY OF INVENTION

Technical Problem

It should be noted that polyimides are insoluble in water. Therefore, in order to form a negative electrode active material layer including a polyimide resin as a binder, it is necessary to prepare a polyimide precursor solution in which a polyimide precursor is dissolved in an organic solvent. Then, the polyimide precursor solution is mixed with an active material to form a slurry, and the slurry is applied to a current collector and heated to form a negative electrode active material layer including a polyimide resin. Meanwhile, there is an increasing demand for suppressing the use of organic solvents as much as possible in the electrode production process in order to reduce the effect of environment.

Accordingly, the present invention provides an electrode material (active material particles, slurry, etc.) which can suppress the amount of organic solvent used and improve the charge-discharge cycle of the electrode.

Solution to Problem

A polyimide-coated active material particle according to the present invention includes an active material particle and a polyimide layer derived from a monomeric polyimide precursor and coated on the active material particle.

The thickness of the polyimide layer in the polyimide-coated active material particle may be 0.5 nm or more and 50 nm or less.

The polyimide layer in the polyimide-coated active material particle may have a porous structure.

The monomeric polyimide precursor in the polyimide-coated active material particle may include a tetracarboxylic acid ester compound and a polyamine compound.

The polyimide layer in the polyimide-coated active material particle may further include a polyimide resin derived from a polymeric polyimide precursor.

A slurry for an electrode material according to the present invention includes the above-described polyimide-coated active material particle of the present invention and an aqueous binder.

The aqueous binder in the slurry for an electrode material may be a polyacrylic acid, a styrene-butadiene rubber, carboxymethyl cellulose, or a mixture of at least two thereof.

The slurry for an electrode material may further include an electrically conductive additive.

A negative electrode according to the present invention includes a current collector and an active material layer including the above-described polyimide-coated active material particle of the present invention and an aqueous binder. A negative electrode according to another aspect of the present invention includes a current collector and an active material layer formed by applying the above-described slurry for an electrode material of the present invention to the current collector.

A negative electrode according to yet another aspect of the present invention includes a current collector and an active material layer including negative electrode active material particles coated with a polyimide layer derived from a monomeric polyimide precursor and an aqueous binder.

A battery according to the present invention includes a positive electrode, the above-described negative electrode of the present invention, a separator disposed between the positive electrode and the negative electrode, and an electrolyte-containing medium filled between the positive electrode and the negative electrode.

A battery according to another aspect of the present invention includes a positive electrode, a negative electrode, a separator disposed between the positive electrode and the negative electrode, and an electrolyte-containing medium filled between the positive electrode and the negative electrode, wherein the negative electrode includes a current collector and an active material layer including negative electrode active material particles and an aqueous binder, and a ratio of a charge-discharge cycle characteristic of the battery to a charge-discharge cycle characteristic of a battery including a negative electrode having an active material layer using a polyimide as a binder is 43.0% or more.

A method for producing a polyimide-coated active material particle according to the present invention includes a coating step of coating an active material particle with a polyimide precursor solution including a monomeric polyimide precursor, and a heating step of heating the active material particle coated with the monomeric polyimide precursor.

ADVANTAGEOUS EFFECTS OF INVENTION

According to the present invention, it is possible to provide a polyimide-coated active material particle in which an active material particle, which is a material for a negative electrode of a battery, is coated with a polyimide layer derived from a monomeric polyimide precursor. By forming the negative electrode of the electrode by using this active material particle, it is possible to suppress the deterioration of cycle characteristic when the battery is repeatedly charged and discharged.

Further, according to the present invention, it is possible to provide a slurry for an electrode material of a battery including active material particles coated with a polyimide layer derived from a monomeric polyimide precursor and an aqueous binder. With the slurry for an electrode material of the present invention, it is possible to form a negative electrode in which the degree of deterioration of charge-discharge cycle characteristic is suppressed to a low level without using an organic solvent having a large environmental load as a binder. Therefore, it is possible to reduce the amount of organic solvent used in the electrode production process.

Also, heating at a high temperature is required to convert a polyimide precursor into a polyimide. By contrast, in the present invention, since the aqueous binder is used and a polyimide binder is not used, it is not necessary to perform high-temperature treatment in the electrode production process. Therefore, it is not necessary to use a high-temperature furnace or an environment equipment that prevents a copper foil, which is a collector, from oxidation, and increase in equipment cost can be suppressed.

Furthermore, in the present invention, the active material layer of the negative electrode constituting the battery includes the negative electrode active material particles coated with the polyimide layer derived from the monomeric polyimide precursor, and the aqueous binder. As a result, it is possible to provide a battery with a further improved charge-discharge cycle.

DESCRIPTION OF EMBODIMENTS

An embodiment of the present invention will be described hereinbelow. In the present embodiment, a negative electrode produced using polyimide-coated active material particles and a battery equipped with the negative electrode will be described as specific examples of the present invention. Further, in the present embodiment, an example of the slurry for an electrode material of the present invention which is used for producing an electrode such as a negative electrode will also be described. Furthermore, in the present embodiment, a method for producing active material particles coated with a polyimide will be described.

[Negative Electrode]

Figure 1:
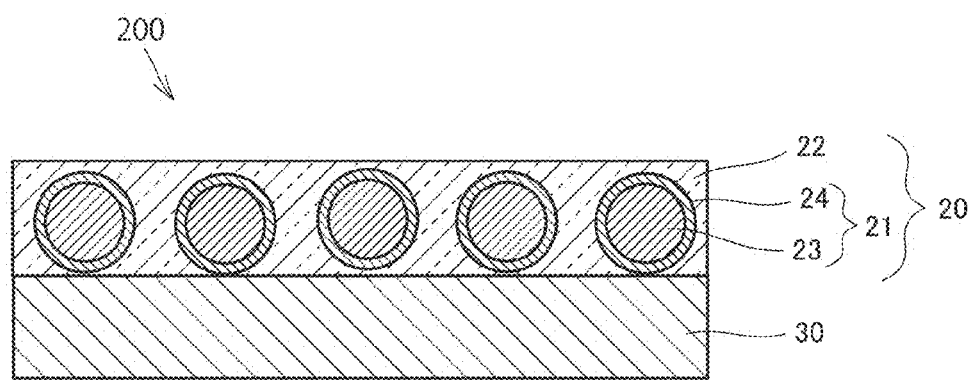
FIG. 1 is a cross-sectional view showing the configuration of an electrode according to an embodiment of the present invention.

FIG. 1 shows the cross-sectional configuration of the negative electrode according to an embodiment of the present invention. As shown in FIG. 1, a negative electrode 200 according to an embodiment of the present invention includes an active material layer 20 and a current collector 30. The negative electrode 200 is suitable for a lithium secondary battery or the like. The active material layer 20 is formed on the current collector 30. The active material layer 20 and the current collector 30 will be described hereinbelow in detail.

<Active Material Layer>

The active material layer 20 has polyimide-coated active material particles 21 and an aqueous binder 22. The thickness of the active material layer 20 can be, for example, within the range of 10 μm or more and 100 μm or less. However, in the present invention, this thickness is not particularly limited.

Each polyimide-coated active material particle 21 is mainly formed from an active material particle 23 and a polyimide layer 24 derived from a monomeric polyimide precursor and coated on the active material particle 23. The polyimide-coated active material particle 21 is an example of the polyimide-coated active material particle of the present invention.

The aqueous binder 22 has a role of binding the polyimide-coated active material particles 21 with each other in the active material layer 20 and binding the current collector 30 and the active material particles 21. In addition to a water-soluble binder, the "aqueous binder" of the present invention is also inclusive of a binder which is dispersed in an emulsified state in water (in the form of an emulsion). By using such an aqueous binder when forming the active material layer 20 of the negative electrode 200 of the present embodiment, it is possible to use a water-soluble solvent as the solvent therefore. This eliminates the need to prepare a binder by using an organic solvent producing a relatively large load on environment. Further, the amount of the organic solvent used for electrode production can be reduced.

Examples of the aqueous binder 22 having water solubility include polyacrylic acid (PAA), carboxymethyl cellulose (CMC), polyethylene oxide, and homopolymers or copolymers of ethylenic unsaturated carboxylic acids such as acrylic acid, methacrylic acid, itaconic acid, fumaric acid, and maleic acid. Incidentally, acids such as polyacrylic acid and unsaturated carboxylic acids may be used by dissolving a salt thereof with a metal such as sodium in water.

Examples of the aqueous binder 22 dispersed in the form of an emulsion include polyvinylidene fluoride (PVDF), polytetrafluoroethylene, polyepichlorohydrin, polyphosphazene, polyacrylonitrile, polyvinyl chloride, methacrylic resin, modified polyphenylene oxide, polyethylene, polypropylene, and ethylene-propylene polymer; styrene butadiene rubber (SBR), isoprene rubber, butyl rubber, acrylic rubber, butadiene rubber, ethylene-acrylic acid copolymer, and ethylene-(meth)acrylic acid copolymer; and ethylenic unsaturated carboxylic acid esters such as methyl (meth)acrylate, ethyl (meth)acrylate, butyl (meth)acrylate, (meth)acrylonitrile, and hydroxyethyl (meth)acrylate.

These aqueous binders may be used singly or in a mixture of at least two thereof.

Among them, it is particularly preferable to use polyacrylic acid, styrene-butadiene rubber, carboxymethyl cellulose, or a mixture of at least two of them as the aqueous binder 22. By using such an aqueous binder, it is possible to obtain a more satisfactory binding property of the polyimide-coated active material particles.

The amount of the aqueous binder 22 in the active material layer 20 is preferably 1% by mass or more and 50% by mass or less, more preferably 1.5% by mass or more and 35% by mass or less, and even more preferably 2% by mass or more and 25% by mass or less of the total mass of the active material layer 20. When the amount of the aqueous binder is 1% by mass or more and 50% by mass or less, the adhesion between the active material particles and between the active material particles and the current collector is strong and a high cycle characteristic can be maintained.

The aqueous binder 22 may include an electrically conductive additive. An electrically conductive filler is an example of the electrically conductive additive. Examples of the electrically conductive filler include carbon black, Ketjen black, acetylene black, carbon whiskers, carbon fibers such as vapor-grown carbon fibers (VGCF), natural graphite, artificial graphite, carbon nanoparticles, carbon nanotubes, metal powders or metal fibers including titanium oxide, ruthenium oxide, aluminum, nickel, copper or the like, and electrically conductive oxides and nitrides. These conductive fillers may be used singly or in combination.

The active material layer 20 can be formed from a slurry for an electrode material. Details of the slurry for an electrode material will be described below.

<Current Collector>

The current collector 30 is preferably an electrically conductive metal foil. The electrically conductive metal foil is formed of a metal such as copper, nickel, iron, titanium, and cobalt, or an alloy such as stainless steel obtained by combining these metals.

The surface of the current collector 30 may be roughened in order to improve binding property with the active material layer 20. The surface roughening of the current collector 30 is performed by providing electrolytic copper or an electrolytic copper alloy on the surface of the current collector 30.

The surface roughening of the current collector 30 may also be carried out by roughening the surface of the current collector 30. Examples of a roughening treatment method include a vapor phase growth method, an etching method, and a polishing method. Examples of the vapor growth method include a sputtering method, a CVD method, and a vapor deposition method. Examples of the etching method include a physical etching method and a chemical etching method. Examples of the polishing method include polishing with sandpaper and polishing by a blasting method.

[Slurry for Electrode Material]

The slurry for an electrode material for producing the active material layer 20 constituting the negative electrode 200 will be described below. The slurry for an electrode material includes at least the polyimide-coated active material particles 21 and the aqueous binder 22.

<Polyimide-Coated Active Material Particles>

First, polyimide-coated active material particles 21 contained in the slurry for an electrode material and a method for producing the same will be described. As indicated above, the polyimide-coated active material particle 21 is mainly composed of the active material particle 23 and the polyimide layer 24 coated on the active material particle 23.

The average particle diameter of the active material particles 23 is more than 0 µm and less than 20 µm, preferably more than 0 µm and less than 10 µm, even more preferably more than 0 µm and less than 8 µm, still more preferably more than 0 µm and less than 7 µm, and most preferably more than 0 µm and less than 6 µm. The average particle diameter, as referred to herein, is measured by a laser diffraction/scattering method using a particle diameter distribution measuring apparatus Microtrac MT3100II (manufactured by Nikkiso Co., Ltd.). In lithium secondary batteries, a more satisfactory cycle characteristic tends to be obtained with a smaller average particle diameter of the active material particles 23. Where the active material particles 23 having a small average particle diameter are used, the absolute amount of the volume expansion and shrinkage of the active material particles 23 accompanying the occlusion/release of lithium in the charge-discharge reaction of a lithium secondary battery or the like becomes small. Therefore, the absolute amount of distortion between the active material particles 23 in the negative electrode 200 during the charge-discharge reaction also becomes small.

The particle diameter distribution of the active material particles 23 is preferably as narrow as possible. Where the width of the particle diameter distribution is large, there is a large difference in the absolute amount of volume expansion and shrinkage accompanying the occlusion/release of lithium between the active material particles 23 having significantly different particle diameters.

For example, silicon (Si) particles, silicon oxide (SiO) particles, silicon alloy particles, metal particles of tin (Sn), lead (Pb), aluminum (Al), or zinc (Zn), and particles of oxides of these metals can be used as the active material particles 23.

When silicon oxide is used for the active material particles 23, the composition ratio of Si and O can be $Si:O=1:X$ ($0<X<2$), and preferably $Si:O=1:X$ ($0.7 \leq X \leq 1.5$).

When a silicon alloy is used, for instance a solid solution of silicon and one or more other elements, an intermetallic compound of silicon and one or more other elements, and an eutectic alloy of silicon and one or more other elements can be used. The active material particles 23 may also include particles made of a material alloyed with lithium. Examples of such materials include germanium, tin, lead, zinc, magnesium, sodium, aluminum, gallium, indium, and alloys thereof.

As a manufacturing method of the silicon alloy, for example, an arc melting method, a liquid quenching method, a mechanical alloying method, a sputtering method, a chemical vapor deposition method, and a calcining method can be used. In particular, a single roll quenching method, a twin roll quenching method, and various atomizing methods such as a gas atomizing method, a water atomizing method, and a disk atomizing method can be used as the liquid quenching method.

The active material particle 23 may be a core-shell type active material particle in which the abovementioned silicon (Si) particle, silicon oxide (SiO) particle, silicon alloy particle, tin (Sn) particle or the like is coated with a metal or the like. The core-shell active material particles are produced by an electroless plating method, an electroplating method, a chemical reduction method, a vapor deposition method, a sputtering method, a chemical vapor deposition method, or the like. It is preferable that the shell portion be formed of the same metal as the metal forming the current collector 30. Bonding between the core-shell type active material particles and the current collector 30 is greatly improved, and excellent charge-discharge cycle characteristic can be obtained. The shell portion may be formed of a silane coupling agent instead of the metal. Where the active material particles 23 are subjected to surface treatment with a silane coupling agent, the active material particles 23 can be satisfactorily dispersed in the below-described slurry, and at the same time, binding property of the active material particles 23 to the polyimide layer 24 can be enhanced.

The polyimide layer 24 that coats the active material particles 23 is formed from a monomeric polyimide precursor. As a result, the polyimide layer 24 has a porous structure. The porous structure, as referred to herein, is a structure in which the polyimide layer 24 has a mesh-like structure and in which electrons and lithium ions can be smoothly transferred.

Thus, in the polyimide-coated active material particle 21 of the present embodiment, the active material particle 23 is coated with the polyimide layer 24. Therefore, when a negative electrode is formed using the polyimide-coated active material particles 21 of the present embodiment, it is possible to suppress the deterioration of the charge-discharge cycle characteristic of the battery. This is supposedly because by coating the active material particles 23 with the polyimide layer 24, it is possible to suppress the degree of fracture of the active material particles 23 caused by the expansion and shrinkage of the active material particles 23 when the battery is repeatedly charged and discharged.

Further, where the polyimide layer 24 has a porous structure, the active material particle 23 is not completely coated and it is possible to expose partially the surface of the active material particle 23. As a result, it is possible to prevent the coating of the polyimide layer 24 from interfering with the occlusion/release of lithium into/from the active material particles 23 in the charge-discharge reaction in the battery.

The thickness of the polyimide layer 24 is 0.5 nm or more and 50 nm or less, preferably 1 nm or more and 30 nm or less, and more preferably 3 nm or more and 15 nm or less. When the thickness of the polyimide layer is 0.5 nm or more and 50 nm or less, degradation of the active material due to charging and discharging can be suppressed, and transfer of electrons and lithium ions occurring between the active material and the electrolytic solution can be carried out smoothly, thereby making it possible to suppress capacity deterioration.

The polyimide resin contained in the polyimide layer 24 is a polymer resin including an imide bond in a repeating unit. The polyimide resin contained in the polyimide layer 24 is formed from a monomeric polyimide precursor.

The molar ratio of the tetracarboxylic acid ester compound and the polyamine compound contained in the monomeric polyimide precursor solution (slurry) is usually in the range of 55:45 to 45:55. The molar ratio of the tetracarboxylic acid ester compound and the polyamine compound can be appropriately changed to ratios other than those presented hereinabove, provided that the essence of the present invention is not affected.

The tetracarboxylic acid ester compound is preferably an aromatic tetracarboxylic acid ester compound. Further, the tetracarboxylic acid ester compound is preferably a tetracarboxylic acid diester compound. The tetracarboxylic acid ester compound can be obtained very easily by esterifying the corresponding tetracarboxylic acid dianhydride with an alcohol. The esterification of the tetracarboxylic acid dianhydride is preferably carried out at a temperature of 50° C. or higher and 150° C. or lower.

Examples of the tetracarboxylic acid dianhydride for forming the tetracarboxylic acid ester compound include aromatic tetracarboxylic acid dianhydrides such as pyromellitic dianhydride (PMDA), 1,2,5,6-naphthalenetetracarboxylic acid dianhydride, 1,4,5,8-naphthalenetetracarboxylic acid dianhydride, 2,3,6,7-naphthalenetetracarboxylic acid dianhydride, 2,2',3,3'-biphenyltetracarboxylic acid dianhydride, 2,3,3',4'-biphenyltetracarboxylic acid dianhydride, 3,3',4,4'-biphenyltetracarboxylic acid dianhydride (BPDA), 2,2',3,3'-benzophenonetetracarboxylic acid dianhydride, 2,3,3',4'-benzophenonetetracarboxylic acid dianhydride, 3,3',4,4'-benzophenonetetracarboxylic acid dianhydride (BTDA), bis(3,4-dicarboxyphenyl)sulfone dianhydride, bis(2,3-dicarboxyphenyl)methane dianhydride, bis(3,4-dicarboxyphenyl)methane dianhydride, 1,1-bis(2,3-dicarboxyphenyl)ethane dianhydride, 1,1-bis(3,4-dicarboxyphenyl)ethane dianhydride, 2,2-bis[3,4-(dicarboxyphenoxy)phenyl]propane dianhydride (BPADA), (4,4'-(hexafluoroisopropylidene)diphthalic anhydride, oxydiphthalic anhydride (ODPA), bis(3,4-dicarboxyphenyl) sulfone dianhydride, bis(3,4-dicarboxyphenyl)sulfoxide dianhydride, thiodiphthalic dianhydride, 3,4,9,10-perylenetetracarboxylic dianhydride, 2,3,6,7-anthracenetetracarboxylic acid dianhydride, 1,2,7,8-phenanthrenetetracarboxylic acid dianhydride, 9,9-bis(3,4-dicarboxyphenyl)fluorene dianhydride, and 9,9-bis[4-(3,4'-dicarboxyphenoxy)phenyl]fluorene dianhydride, and also cyclobutanetetracarboxylic acid dianhydride, 1,2,3,4-cyclopentanetetracarboxylic acid dianhydride, 2,3,4,5-tetrahydrofurantetracarboxylic acid dianhydride, 1,2,4,5-cyclohexanetetracarboxylic acid dianhydride, 3,4-dicarboxy-1-cyclohexylsuccinic dianhydride, and 3,4-dicarboxy-1,2,3,4-tetrahydro-1-naphthalenesuccinic dianhydride. These tetracarboxylic acid dianhydrides may be used singly or in a mixture.

Examples of alcohols for forming the tetracarboxylic acid ester compounds include methanol, ethanol, 1-propanol, 2-propanol, 1-butanol, 2-butanol, 2-methyl-1-propanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, 2,2-dimethyl-1-propanol, 1-hexanol, 2-methyl-1-pentanol, 4-methyl-2-pentanol, 2-ethyl-1-butanol, cyclohexanol, 2-methoxyethanol, 2-ethoxyethanol, 2-(methoxymethoxy)ethanol, 2-isopropoxyethanol, 2-butoxyethanol, phenol, 1-hydroxy-2-propanone, 4-hydroxy-2-butanone, 3-hydroxy-2-butanone, 1-hydroxy-2-butanone, 2-phenylethanol, 1-phenyl-1-hydroxyethane, and 2-phenoxyethanol. Examples of other alcohols for forming the tetracarboxylic acid ester compound include polyhydric alcohols such as 1,2-ethanediol, 1,2-propanediol, 1,3-propanediol, 1,3-butanediol, 1,4-butanediol, 2,3-butanediol, 1,5-pentanediol, 2-methyl-2,4-pentanediol, glycerol, 2-ethyl-2-(hydroxymethyl)-1,3-propanediol, 1,2,6-hexanetriol, 2,2'-dihydroxydiethyl ether, 2-(2-methoxyethoxy)ethanol, 2-(2-ethoxyethoxy)ethanol, 3,6-dioxaoctane-1,8-diol, 1-methoxy-2-propanol, 1-ethoxy-2-propanol, and dipropylene glycol. These alcohols may be used singly or in a mixture.

Among the tetracarboxylic acid ester compounds composed of the tetracarboxylic dianhydride and the alcohol, it is particularly preferable that 3,3',4,4'-benzophenonetetracarboxylic acid dianhydride (BTDA), pyromellitic dianhydride (PMDA), or 3,3',4,4'-biphenyltetracarboxylic acid dianhydride (BPDA) are selected as the tetracarboxylic dianhydride. The tetracarboxylic acid ester compound can also be produced by another method, for example, by directly esterifying a tetracarboxylic acid.

In the present invention, the polyamine compound is preferably a diamine compound or a triamine compound. Further, the polyamine compound is preferably an aromatic polyamine compound. Furthermore, the aromatic polyamine compound is preferably an aromatic diamine compound or an aromatic triamine compound.

Examples of the diamine compound include paraphenylenediamine (PPD), metaphenylenediamine (MPDA), 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, 2,2-bis(trifluoromethyl)-4,4'-diaminobiphenyl, 3,3'-diaminodiphenylmethane, 4,4'-diaminodiphenylmethane (MDA), 2,2-bis-(4-aminophenyl) propane, 3,3'-diaminodiphenyl sulfone (33DDS), 4,4'-diaminodiphenyl sulfone (44DDS), 3,3'-diaminodiphenyl sulfide, 4,4'-diaminodiphenyl sulfide, 3,3'-diaminodiphenyl ether, 3,4'-diaminodiphenyl ether (34ODA), 4,4'-diaminodiphenyl ether (ODA), 1,5-diaminonaphthalene, 4,4'-diaminodiphenyldiethylsilane, 4,4'-diaminodiphenylsilane, 4,4'-diaminodiphenylethylphosphine oxide, 1,3-bis(3-aminophenoxy)benzene (133APB), 1,3-bis(4-aminophenoxy)benzene (134APB), 1,4-bis(4-aminophenoxy)benzene, bis[4-(3-aminophenoxy)phenyl] sulfone (BAPSM), bis[4-(4-aminophenoxy)phenyl]sulfone (BAPS), 2,2-bis[4-(4-aminophenoxy)phenyl]propane (BAPP), 2,2-bis(3-aminophenyl)-1,1,1,3,3,3-hexafluoropropane, 2,2-bis(4-aminophenyl)-1,1,1,3,3,3-hexafluoropropane, and 9,9-bis(4-aminophenyl)fluorene. These diamine compounds may be used singly or in a mixture.

Examples of trivalent amine compounds include 2,4,6-triaminopyrimidine (TAP), 1,3,5-triaminobenzene, 1,3,5-tris (4-aminophenyl)benzene, 3,4,4'-triaminodiphenyl ether, 6-phenylpteridine-2,4,7-triamine, tris(4-aminophenyl) methanol, melamine, 2',4',4-triaminobenzanilide, 2,5,6-triamino-3-methylpyrimidin-4(3H)-one, 1,4,5,8-tetraaminoanthraquinone, and 3,3'-diaminobenzidine. Among these, 2,4,6-triaminopyrimidine (TAP) and tris(4-aminophenyl) methanol are preferable. These triamine compounds may be used singly or in a mixture. Also, a mixture of a diamine compound and a triamine compound may be used.

Further, the polyamine compound may have an anionic group. As the anionic group, for example, a carboxyl group, a sulfuric acid ester group, a sulfonic acid group, a phosphoric acid group, or a phosphoric acid ester group is used. Among these anionic groups, a carboxyl group is particularly preferable. As the polyamine compound having an anionic group, for example, 3,4-diaminobenzoic acid, 3,5-diaminobenzoic acid (3,5-DABA), or metaphenylenediamine-4-sulfonic acid is used. By using a polyamine compound having an anionic group, it is possible to form the polyimide layer 24 having an anionic group.

A polyamine compound having an anionic group and a polyamine compound not having an anionic group may be used in a mixture. In this case, the polyamine compound having an anionic group preferably constitutes 30 mol % or more, more preferably 40 mol % or more, even more preferably 60 mol % or more, still more preferably 80 mol % or more, even more preferably 90 mol % or more, and still more preferably 95 mol % or more of the total polyamine compound.

Among the above polyamine compounds, metaphenylenediamine (MPDA), 3,5-diaminobenzoic acid (3,5-DABA), and 2,4,6-triaminopyrimidine (TAP) are particularly preferred.

The organic solvent dissolves the tetracarboxylic acid ester compound and the polyamine compound. As the organic solvent, for example, alcohols for forming the abovementioned tetracarboxylic acid ester are preferably used. Specifically, lower alcohols such as methanol, ethanol, 1-propanol, and 2-propanol are preferably used as the alcohols. In addition to alcohols, N-methyl-2-pyrrolidone, dimethylacetamide, aromatic hydrocarbons or the like may be added to the organic solvent.

The monomeric polyimide precursor solution (slurry) may include an electrically conductive additive. An example of the electrically conductive additive is an electrically conductive filler. For example, materials mentioned in the description of the active material layer can be used as the electrically conductive filler.

The amount of the polyimide layer 24 in the polyimide-coated active material particle 21 is preferably 1% by mass or more and 50% by mass or less, more preferably 5% by mass or more and 30% by mass or less, and even more preferably 10% by mass or more and 20% by mass or less of the total mass of the polyimide-coated active material particle 21. When the amount of the polyimide layer is 1% by mass or more and 50% by mass or less of the total mass of the polyimide-coated active material particle, deterioration of the active material due to charging and discharging can be prevented. Further, when the amount of the polyimide layer is 1% by mass or more and 50% by mass or less of the total mass of the polyimide-coated active material particle, transfer of electrons and lithium ions occurring between the active material and the electrolytic solution can be carried out smoothly, thereby making it possible to suppress capacity deterioration.

The abovementioned polyimide-coated active material particles 21 are produced by a manufacturing method including a coating step of coating the active material particles 23 with a polyimide precursor solution including a monomeric polyimide precursor and a heating step of heating the active material particles 23 coated with the monomeric polyimide precursor.

Thus, in the method for producing the polyimide-coated active material particles 21, first, a monomeric polyimide precursor solution (slurry) having the above composition is prepared, and the obtained slurry is applied to the entire surface of the active material particles 23. A method (dipping method) in which the active material particles 23 are dipped in the slurry and then pulled up, and a method in which a fluidized bed apparatus is used and the slurry is sprayed while the active material particles are caused to flow in the apparatus can be used as a method for applying the slurry to the active material particles 23, but these examples are not limiting.

The active material particles 23 coated with the slurry are then heated. In the heating step, the slurry covering the surface of the active material particles 23 is heated to cause an imidization reaction of the polyimide precursor, and a polyimide layer 24 having a thickness, for example, of 3 nm or more and 15 nm or less is formed.

For example, a method using an ordinary thermostatic oven, a discharge plasma sintering method, or a hot press method can be used as the heating method. By forming the polyimide layer 24 from the monomeric polyimide precursor solution, the polyimide layer 24 having a porous structure is obtained.

The heating temperature is preferably equal to or higher than the temperature at which the monomeric polyimide precursor in the slurry is imidized to become a substance with a sufficiently high molecular weight and is equal to or lower than the melting point of the active material particles 23. The monomeric polyimide precursor is mainly composed of a tetracarboxylic acid diester compound and a polyamine compound. For example, the molecular weight thereof is increased by heating and subsequent imidization yields a polyimide resin. The recommended heating temperature of the slurry is between 100° C. and 400° C. The calcining temperature of this slurry is more preferably between 150° C. and 400° C., and still more preferably between 200° C. and 400° C. Such ranges are selected to prevent the active material particles 23 from heat-induced deterioration and maintain a crosslinked structure of the polyimide resin, particularly when the tetracarboxylic acid ester compound is BTDA.

The polyimide-coated active material particles 21 can be produced by the above-described method. A slurry for an electrode material which is produced using the polyimide-coated active material particles 21 will be described hereinbelow.

The slurry for an electrode material includes at least the above-described polyimide-coated active material particles 21 and the aqueous binder 22. For the aqueous binder 22, those exemplified above in the description of the active material layer 20 can be used. The aqueous binder 22 is contained in a state of being dissolved or dispersed in a water-soluble solvent such as water.

The slurry for an electrode material may further include an electrically conductive additive. An example of the electrically conductive additive is an electrically conductive filler. For example, materials mentioned in the description of the active material layer can be used as the electrically conductive filler.

In addition, the slurry for an electrode material may include a dispersant or the like. The dispersant added to the slurry for an electrode material uniformly disperses the polyimide-coated active material particles 21 in the slurry. For example, sorbitan monooleate, N,N-lauryldimethylamine, N,N-dimethylstearylamine, and N-cocoalkyl-1,3-diaminopropane are used as the dispersant. These dispersants may be used singly or in combination.

<Method for Forming Electrode>

Next, a method for forming an electrode (specifically, a negative electrode) by using the above-described slurry for an electrode material will be described. The negative electrode 200 is formed by a method including a step of applying the slurry for an electrode material to the current collector 30 and a step of drying the current collector 30 to which the slurry for an electrode material has been applied.

In the drying step, the current collector 30 to which the slurry for an electrode material has been applied is dried at a temperature of, for example, 80° C. or more and 180° C. or less.

With the drying step, the aqueous binder 22 contained in the slurry for an electrode material is dried, and the active material layer 20 is formed. The aqueous binder 22 plays a role of bonding polyimide-coated active material particles (negative electrode active material particles) 21 to each other and bonding the current collector 30 and the active material particles 21 in the active material layer 20.

Since the aqueous binder is used as the binder in the electrode (negative electrode 200) produced by the above method, a water-soluble solvent can be used as a solvent contained in the binder. This eliminates the need to prepare a binder by using an organic solvent producing a relatively large load on environment. Further, the amount of the organic solvent used for electrode production can be reduced.

In addition, in this method for forming an electrode, the heating temperature in the drying step can be lower than that when a polyimide is used as a binder.

In particular, when a copper foil is used as the current collector 30, where the copper foil is heated at a temperature higher than 200° C., oxidation of the copper foil increases the electric resistance of the current collector or decreases the strength (tensile strength) thereof. However, where this method for forming an electrode is used, even when the current collector 30 is made of a copper foil, it is possible to suppress the increase in resistance and decrease in strength (tensile strength) caused by oxidation of the copper foil.

[Method for Detecting Polyimide Coating]

For example, the following method can be used to verify that the aqueous binder and polyimide-coated active material particles are included in the above-described negative electrode according to the present embodiment.

First, an electrolyte medium is removed by cleaning from the sheet-shaped negative electrode including the current collector. Then, the sheet electrode is immersed in an organic solvent such as chloroform. At this time, in the sheet electrode using the aqueous binder, the aqueous binder is extracted into the organic solvent, and the polyimide-coated active material particles and the current collector remain in the organic solvent. Removing the current collector remaining in the organic solvent and then filtering the organic solvent leaves a powdery residue. This powdery residue is presumed to be polyimide-coated active material particles.

Here, in the case of a negative electrode using a polyimide resin as a binder, the polyimide resin is not dissolved in chloroform and does not become powdery. Therefore, it is possible to discriminate between a negative electrode using a polyimide resin as a binder and the negative electrode of the present invention.

Then, gas chromatographic mass analysis (pyrolytic GC/MC) is performed on the obtained powdery residue, for example, at a temperature of about 600° C., and the composition of the product is verified. This makes it possible to detect whether the polyimide is present in the residue.

Further, for example, by performing Auger electron spectroscopic analysis performed in Example 2 described hereinbelow, it is possible to detect whether the polyimide derived from the monomeric polyimide precursor is contained in the polyimide-coated active material particles contained in the residue.

[Battery]

Figure 2:
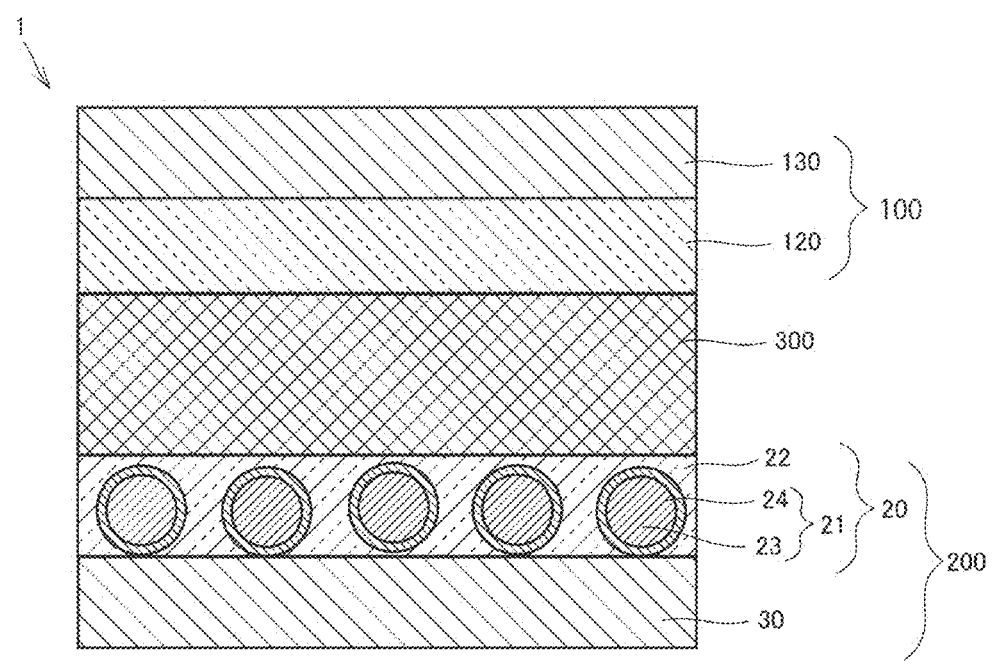
FIG. 2 is a cross-sectional view showing the configuration of a battery according to an embodiment of the present invention.

A battery according to an embodiment of the present invention will be described hereinbelow. Here, a lithium secondary battery will be described as an example of the battery of the present invention. FIG. 2 shows a cross-sectional configuration of a lithium secondary battery 1 (simply referred to hereinbelow as battery 1) of the present embodiment. As shown in FIG. 2, the battery 1 includes a positive electrode 100, a negative electrode 200, and a separator 300 disposed between the positive electrode 100 and the negative electrode 200. Although not shown in the figure, an electrolyte-containing medium is filled between the positive electrode 100 and the negative electrode 200. Further, the positive electrode 100, the negative electrode 200, and the separator 300 are covered with a packaging material (not shown in the figure).

For instance, a known positive electrode for a lithium secondary battery is used for the positive electrode 100. The positive electrode 100 includes an active material layer 120 and a current collector 130. The active material layer 120 is formed on the current collector 130. The active material layer 120 may have the same configuration as that of the active material layer 20 of the above-described negative electrode 200, except that the material of the active material particles is appropriately changed. For example, a lithium-containing transition metal oxide such as lithium cobalt oxide ($LiCoO_2$), lithium nickel oxide ($LiNiO_2$), and lithium manganese oxide ($LiMn_2O_4$) can be used for the active material particles of the positive electrode 100.

Since the configuration described above with reference to FIG. 1 can be used for the negative electrode 200, description thereof is herein omitted.

The current collector 130 may have the same configuration as the current collector 30 of the above-described negative electrode 200, except that the material to be used is appropriately changed. The current collector 130 is preferably an electrically conductive metal foil. This electrically conductive metal foil is formed of a metal such as aluminum, aluminum alloy, nickel, titanium or the like, or an alloy such as stainless steel obtained by combining these metals.

A known separator for a lithium secondary battery is used for the separator 300. Specifically, for example, a separator made of a polyimide resin, a glass nonwoven fabric separator, a pulp separator, an aramid separator, a separator made of a polypropylene resin, or a separator made of a polyamide imide resin is used.

For instance, a known electrolyte-containing medium for a lithium secondary battery is used for the electrolyte-containing medium. For example, a solution obtained by dissolving a lithium salt which is an electrolyte in an organic solvent can be used as the electrolyte-containing medium. At least one selected from nonaqueous solvents such as ethylene carbonate, propylene carbonate, dimethyl carbonate, diethyl carbonate, ethyl methyl carbonate, dimethyl ether, isopropyl methyl carbonate, vinylene carbonate, γ-butyrolactone, and acetonitrile may be used as the organic solvent. A mixture of a plurality of these organic solvents may be used. For example, $LiPF_6$, $LiBF_4$, $LiAsF_6$, $LiCF_3SO_3$, LiI, and $LiClO_4$ can be used as the electrolyte.

The positive electrode 100, the negative electrode 200, the separator 300, and the electrolyte-containing medium are accommodated in the packaging material. For example, a polyimide resin film, an aromatic polyamide resin film, a polyamidoimide resin film, a polyalkylene terephthalate resin film, and an aluminum laminate film can be used as this packaging material.

[Other Embodiments]
<Polyimide Layer Including Polyimide Resin Derived from Polymeric Polyimide Precursor>

In the above embodiment, the polyimide-coated active material particle having a polyimide layer formed from a monomeric polyimide precursor has been described. However, the present invention is inclusive not only of a polyimide-coated active material particle in which the polyimide layer is formed only from a monomeric polyimide precursor, but also of a polyimide-coated active material particle having a polyimide layer including a certain amount of a polyimide resin derived from a polymeric polyimide precursor.

Thus, the polyimide precursor solution for forming the polyimide layer may include a polymeric polyimide precursor in addition to the monomeric polyimide precursor. For example, a polyamic acid can be mentioned as the polymeric polyimide precursor. A polyamic acid can be obtained by using a tetracarboxylic acid dianhydride and a polyamine compound as raw materials and polymerizing them. The polyamic acid is imidized, for example, by heating to form a polyimide resin. It is believed that the polyimide resin formed from the polyamic acid does not have a porous structure.

In the polyimide-coated active material particles of the present invention, the amount ratio (mass ratio) of the polymeric polyimide precursor to the monomeric polyimide precursor may be 0% or more and 70% or less, preferably 0% or more and 50% or less, and more preferably 0% or more and 30% or less. By setting the mass ratio of the polymeric polyimide precursor to the monomeric polyimide precursor to 50% or less, it is possible to maintain satisfactorily the charge-discharge cycle characteristic of the battery.

<Another Example of Battery>

The battery explained in the above embodiment has the configuration in which the active material particles included in the negative electrode of the battery are coated with the polyimide layer. However, the present invention is not limited to this configuration, and is inclusive of a battery having the following features.

A battery according to another example of the present invention includes a positive electrode, a negative electrode, a separator disposed between the positive electrode and the negative electrode, and an electrolyte-containing medium filled between the positive electrode and the negative electrode. Here, the positive electrode, the separator, and the electrolyte medium may have the same configuration as the positive electrode 100, the separator 300, and the electrolyte medium constituting the above-described battery 1.

The negative electrode includes a current collector and an active material layer including negative electrode active material particles and an aqueous binder. The current collector can have the same configuration as the above-described current collector 30. The aqueous binder included in the active material layer can have the same configuration as the above-mentioned aqueous binder 22. By contrast with the polyimide-coated active material particles 21 described above, the negative electrode active material particles included in the active material layer are not necessarily provided with the polyimide layer 24.

However, in the battery according to this other example, the ratio of the charge-discharge cycle characteristic to the charge-discharge cycle characteristic of a battery equipped a the negative electrode having an active material layer using a polyimide as the binder is specified to be 43.0% or more. In the ratio of the charge-discharge cycle characteristics specified herein, the charge-discharge cycle characteristic of each battery is determined, for example, by the method described in Examples hereinbelow.

In a charge-discharge cycle test, for example, a charge-discharge rate and a cut-off voltage are set to predetermined values, charge-discharge cycles are performed a predetermined number of times, for example about 20 times, and a discharge capacity (mAh/g) is measured for every cycle. Then, for example, the ratio of the discharge capacity in the 20th cycle to the discharge capacity in the first cycle is calculated as a retention rate (%) representing an index of the charge-discharge cycle characteristic of the battery.

The abovementioned battery according to the present invention is such that when the ratio of the retention rate (%) obtained therefor by this method to the reference retention rate (%) of the battery equipped with a negative electrode having an active material layer using a polyimide instead of the aqueous binder as a binder is determined, this ratio is 43.0% or more. In such a battery of the present invention, it is possible, while using an aqueous binder as a binder, to obtain a charge-discharge cycle characteristic comparable to that of a battery using a water-insoluble binder such as a polyimide.

The charge-discharge rate in the charge-discharge cycle test can be, for example, 0.1C or 0.2C. The charge-discharge cycle test of a battery using a polyimide as a binder and serving as a reference of the ratio of charge-discharge cycle characteristics for the battery of the present invention is performed under the same conditions as the charge-discharge cycle test of the battery of the present invention.

Therefore, in the examples described hereinbelow, when the charge-discharge rate is set to 0.1C, the retention rate (%) of the Reference Example 1-1 measured at the charge-discharge rate of 0.1C is used as the reference value of the retention rate (%). Further, when the charge-discharge rate is set to 0.2C, the retention rate (%) of Reference Example 1-2 measured at a charge-discharge rate of 0.2C is used as the reference value of retention rate (%).

Referring to the results of the below-described Examples, when the charge-discharge rate of the charge-discharge cycle test is 0.1C, the ratio of the cycle characteristic of the battery of the present invention to the reference value may be 43.0% or more, preferably 45.0% or more, more preferably 47.0% or more, yet more preferably 49.0% or more, and most preferably 51.0% or more. Further, when the charge-discharge rate of the charge-discharge cycle test is 0.2C, the ratio of the cycle characteristic of the battery of the present invention to the reference value also may be 43.0% or more, preferably 45.0% or more, more preferably 47.0% or more, yet more preferably 49.0% or more, and most preferably 51.0% or more.

It should be considered that the embodiments disclosed herein are exemplary in all respects and are not restrictive. The scope of the present invention is defined not by the description above but by the claims, and it is intended to include all modifications within the meaning and scope equivalent to those of the claims.

EXAMPLES

The present invention will be described hereinbelow in greater detail with reference to examples. The following examples are merely illustrative, and do not limit the present invention.

Example 1

Example 1-1

<Fabrication of Lithium Secondary Battery>

1. Preparation of Monomeric Polyimide Precursor Solution

A synthesis vessel was produced by attaching a stirring rod equipped with a polytetrafluoroethylene stirring blade to a 200 mL three-necked flask. To this synthesis vessel, 38.0 g (0.118 mol) of 3,3',4,4'-benzophenonetetracarboxylic acid dianhydride (BTDA) (manufactured by Daicel Chemical Industries, Ltd.), 10.9 g (0.236 mol) of ethanol (manufactured by Ueno Chemical Industries Ltd.), and 38.4 g of N-methyl-2-pyrrolidone were added so that the solid fraction of the polyimide precursor solution was 50.7% by mass. The contents in the vessel were stirred for 1 h while heating at 90° C. to prepare a BTDA diester solution.

A monomeric polyimide precursor solution was then prepared by cooling the BTDA diester solution to 45° C. or less, and then adding 12.8 g (0.118 mol) of metaphenylenediamine (MPDA) (manufactured by Tokyo Chemical Industry Co., Ltd.) to the BTDA diester solution and stirring for 1 h while heating again to 50° C.

2. Preparation of Polyimide-Coated Active Material Particles

A total of 1.24 g of Ketjen black (KB) (manufactured by Lion Corporation) having a primary particle diameter of 34 nm, 0.31 g of vapor-grown carbon fibers (VGCF) (manufactured by Showa Denko K.K.) and 40 g of N-methyl-2-pyrrolidone were added to 10 g of the above-described monomeric polyimide precursor solution to obtain a polyimide precursor solution (slurry) for coating. A total of 24.8 g of silicon powder (product name: Silgrain (registered trademark) e-Si, manufactured by Elkem AS) having a median diameter of 2.13 μm was added to the slurry. In this way, the silicon powder was immersed in the slurry to obtain an intermediate of polyimide-coated active material particles.

The obtained intermediate of polyimide-coated active material particles was thermally treated (calcined) for 3 h at 350° C. and sintered to obtain polyimide-coated active material particles. The solid fraction ratio (% by mass) of each material in the finally obtained polyimide-coated active material particles is shown in Table 2.

3. Preparation of Negative Electrode

A total of 0.308 g of the above-described polyimide-coated active material particles, 0.011 g of Ketjen black (manufactured by Lion Corporation) and 0.34 g of water were added to 0.1 g of an aqueous sodium polyacrylate solution (product name: Aqualic (registered trademark), product number: DL 453, molecular weight: 50,000, manufactured by Nippon Shokubai Co., Ltd.), followed by thorough mixing with a mortar to prepare a slurry for a negative electrode material. The solid fraction ratio (% by mass) of each composition in the slurry for a negative electrode material used in Example 1-1 is as shown in Table 2.

This slurry for a negative electrode material was applied to one side of a rolled copper foil (thickness 40 μm) as a current collector so that the thickness after drying was 17 μm, and then dried to prepare a negative electrode intermediate. The negative electrode intermediate was cut into a circular shape having a diameter (ϕ) of 11 mm and dried for 2 h at 100° C. under vacuum to prepare a negative electrode. The solid fraction ratio (% by mass) of each material in the finally obtained negative electrode is shown in Table 3.

4. Fabrication of Counter Electrode

A counter electrode (positive electrode) was fabricated by cutting a lithium metal foil having a thickness of 0.5 mm into a circular shape having a diameter of 13 mm.

5. Nonaqueous Electrolytic Solution (Electrolyte-Containing Medium)

A nonaqueous electrolytic solution in which $LiPF_6$ was dissolved to a $LiPF_6$ concentration of 1 mol/L in a solvent prepared by mixing ethylene carbonate and diethyl carbonate at a volume ratio of 1:1 was used.

6. Fabrication of Lithium Ion Secondary Battery

A lithium ion secondary battery was fabricated by incorporating the negative electrode, the counter electrode and the nonaqueous electrolytic solution prepared as described above into a CR2032-type coin cell made of SUS.

The positive electrode and the counter electrode were disposed so as to face each other, with a polypropylene separator (thickness: 25 μm) being interposed therebetween. The separator was reinforced with a glass fiber cloth.

<Charge-Discharge Cycle Test>

The lithium secondary battery obtained as described above was subjected to a charge-discharge cycle test. In the charge-discharge cycle test, the ambient temperature was set to 25° C., the charge-discharge rate was set to 0.1C, the cutoff voltage was 0.0 V at the time of charging and 1.5 V at the time of discharging, and the charge-discharge cycle was performed 20 times. The discharge capacity (mAh/g) was measured for each cycle. Then, "the ratio of the discharge capacity in the 20th cycle to the discharge capacity in the first cycle" was determined as the retention rate (%). In Table 3, the retention rate (%) of the lithium secondary battery obtained in the below-described Example 1-7 is set as a reference value (that is, 1), and the retention rate (%) thus obtained is expressed as a relative ratio of the retention rate to the reference value.

As shown in Table 3, the relative ratio of the retention rate of the lithium secondary battery of Example 1-1 to the retention rate of the lithium secondary battery of Example 1-7 was 0.804.

Example 1-2

In Example 1-2, the amount of the electrically conductive additive (Ketjen black and VGCF) added to the polyimide precursor solution (slurry) for coating was twice that of Example 1-1. Thus, 2.48 g of Ketjen black (manufactured by Lion Corporation) having a primary particle diameter of 34 nm and 0.62 g of vapor-grown carbon fibers (VGCF) (manufactured by Showa Denko K.K.) were added to 10 g of the monomeric polyimide precursor solution to prepare a polyimide precursor solution (slurry) for coating. Except for this, a battery was fabricated in the same manner as in Example 1-1, and the charge-discharge cycle characteristic of the battery was measured in the same manner as in Example 1-1.

The solid fraction ratio (% by mass) of each material in the polyimide-coated active material particles obtained in this Example is shown in Table 2. The solid fraction ratio (% by mass) of each material in the negative electrode obtained in this Example is shown in Table 3. Further, as shown in Table 3, the relative ratio of the retention rate of the lithium secondary battery of Example 1-2 to the retention rate of the lithium secondary battery of Example 1-7 was 0.855.

Example 1-3

In Example 1-3, the amount of the polyimide precursor solution (slurry) for coating the active material particles was 1.66 times that of Example 1-1. A total of 1.37 g of Ketjen black (KB) (manufactured by Lion Corporation) having a primary particle diameter of 34 nm, 0.34 g of vapor-grown carbon fibers (VGCF) (manufactured by Showa Denko K.K.), and 40 g of N-methyl-2-pyrrolidone were added to 16.6 g of the monomeric polyimide precursor solution to obtain a polyimide precursor solution (slurry) for coating. A total of 24.8 g of silicon powder (product name: Silgrain (registered trademark) e-Si, manufactured by Elkem AS) having a median diameter of 2.13 μm was added to the slurry. Except for this, a battery was fabricated in the same manner as in Example 1-1, and the charge-discharge cycle characteristic of the battery was measured in the same manner as in Example 1-1.

The solid fraction ratio (% by mass) of each material in the polyimide-coated active material particles obtained in this Example is shown in Table 2. The solid fraction ratio (% by mass) of each material in the negative electrode obtained in this Example is shown in Table 3. Further, as shown in Table 3, the relative ratio of the retention rate of the lithium secondary battery of Example 1-3 to the retention rate of the lithium secondary battery of Example 1-7 was 1.049.

Example 1-4

In Example 1-4, a carbon powder (purity 98.8%) (manufactured by Ito Graphite Co., Ltd.) was used as active material particles in addition to the silicon powder used in Example 1-1. The mass ratio of the silicon powder and the carbon powder was 30:70. Coating with the polyimide precursor solution (slurry) was performed only on the silicon powder. Furthermore, in Example 1-4, a mixture of styrene butadiene rubber (SBR) and carboxymethyl cellulose (CMC) was used instead of the sodium polyacrylate of Example 1-1 as an aqueous binder used for preparing the negative electrode. The mass ratio of SBR and CMC was 3:2. Further, in Example 1-4, no electrically conductive additive was added to the negative electrode material slurry. The solid fraction ratio (% by mass) of each composition in the slurry for a negative electrode material used in Example 1-4 is as shown in Table 2. Except for this, a battery was fabricated in the same manner as in Example 1-1. Then, the charge-discharge cycle characteristic of the battery was measured in the same manner as in Example 1-1, except that the charge-discharge rate was set to 0.2C.

The solid fraction ratio (% by mass) of each material in the polyimide-coated active material particles obtained in this Example is shown in Table 2. The solid fraction ratio (% by mass) of each material in the negative electrode obtained in this Example is shown in Table 3. Further, as shown in Table 3, the relative ratio of the retention rate of the lithium secondary battery of Example 1-4 to the retention rate of the lithium secondary battery of Example 1-7 was 0.963.

Example 1-5

In Example 1-5, a silicon oxide (SiO) powder (product name: BP Powder, manufactured by Osaka Titanium Technologies Co., Ltd.) having a median diameter of 5.2 μm was used instead of the silicon powder as the active material particles. The composition ratio of Si and O in the used SiO powder was Si:O=1:1.05. Except for this, a battery was fabricated in the same manner as in Example 1-1, and the charge-discharge cycle characteristic of the battery was measured in the same manner as in Example 1-1.

The solid fraction ratio (% by mass) of each material in the polyimide-coated active material particles obtained in this Example is shown in Table 2. The solid fraction ratio (% by mass) of each composition in the slurry for a negative electrode material obtained in this Example is shown in Table 2. Further, the solid fraction ratio (% by mass) of each material in the negative electrode obtained in this Example is shown in Table 3. As shown in Table 3, the relative ratio of the retention rate of the lithium secondary battery of Example 1-5 to the retention rate of the lithium secondary battery of Example 1-7 was 1.051.

Example 1-6

In Example 1-6, a silicon oxide (SiO) powder (product name: BP Powder, manufactured by Osaka Titanium Technologies Co., Ltd.) having a median diameter of 5.2 μm was used instead of the silicon powder as the active material particles. The composition ratio of Si and O in the used SiO powder was Si:O=1:1.05. Except for this, a battery was fabricated in the same manner as in Example 1-1, and the charge-discharge cycle characteristic of the battery was measured in the same manner as in Example 1-1, except that the charge-discharge rate was set to 0.2C.

The solid fraction ratio (% by mass) of each material in the polyimide-coated active material particles obtained in this Example is shown in Table 2. The solid fraction ratio (% by mass) of each composition in the slurry for a negative electrode material obtained in this Example is shown in Table 2. Further, the solid fraction ratio (% by mass) of each material in the negative electrode obtained in this Example is shown in Table 3. As shown in Table 3, the relative ratio of the retention rate of the lithium secondary battery of Example 1-6 to the retention rate of the lithium secondary battery of Example 1-7 was 0.884.

Example 1-7

In Example 1-7, a silicon oxide (SiO) powder (product name: BP Powder, manufactured by Osaka Titanium Technologies Co., Ltd.) having a median diameter of 5.2 μm was used instead of the silicon powder as the active material particles. The composition ratio of Si and O in the used SiO powder was Si:O=1:1.05. Further, in Example 1-7, commercially available sodium polyacrylate (product name: Aqualic (registered trademark), product number: DL522, molecular weight: 170,000, manufactured by Nippon Shokubai Co., Ltd.) was used instead of sodium polyacrylate (molecular weight: 50,000) of Example 1-1 as the aqueous binder used for fabricating the negative electrode. Except for this, a battery was fabricated in the same manner as in Example 1-4. The charge-discharge cycle characteristic of the battery was measured in the same manner as in Example 1-1, except that the charge-discharge rate was set to 0.2C.

The solid fraction ratio (% by mass) of each material in the polyimide-coated active material particles obtained in this Example is shown in Table 2. The solid fraction ratio (% by mass) of each composition in the slurry for a negative electrode material obtained in this Example is shown in Table 2. Further, the solid fraction ratio (% by mass) of each material in the negative electrode obtained in this Example is shown in Table 3.

As described above, the retention rate of the lithium secondary battery measured in Example 1-7 was taken as a reference value (that is, 1.000) for evaluating the retention rate of the lithium secondary batteries in other Examples, Comparative Examples, and the like.

Example 1-8

In Example 1-8, carboxymethyl cellulose (CMC) was used instead of the sodium polyacrylate of Example 1-1 as an aqueous binder used for fabricating the negative electrode. Further, in Example 1-8, the amounts of the aqueous binder (CMC) and Ketjen black used for fabricating the negative electrode were changed. The solid fraction ratio (% by mass) of each composition in the slurry for a negative electrode material used in Example 1-8 is as shown in Table 2. Except for this, a battery was fabricated in the same manner as in Example 1-1, and the charge-discharge cycle characteristic of the battery was measured in the same manner as in Example 1-1.

The solid fraction ratio (% by mass) of each material in the polyimide-coated active material particles obtained in this Example is shown in Table 2. Further, the solid fraction ratio (% by mass) of each material in the negative electrode obtained in this Example is shown in Table 3. As shown in Table 3, the relative ratio of the retention rate of the lithium secondary battery of Example 1-8 to the retention rate of the lithium secondary battery of Example 1-7 was 0.465.

Example 1-9

In Example 1-9, 3,5-diaminobenzoic acid (3,5-DABA) was used instead of metaphenylenediamine (MPDA) of Example 1-1 as the diamine compound included in the monomeric polyimide precursor solution. A BTDA diester solution was prepared by loading 18.4 g (0.057 mol) of 3,3',4,4'-benzophenonetetracarboxylic acid dianhydride (BTDA) (manufactured by Daicel Chemical Industries, Ltd.), 6.30 g (0.140 mol) of ethanol (manufactured by Ueno Chemical Industries Ltd.), and 66.65 g of N-methyl-2-pyrrolidone so that the solid fraction of the polyimide precursor solution was 27.0%, and then stirring the contents of the synthesis vessel for 1 h while heating at 90° C. After cooling the BTDA diester solution to 45° C. or less, 8.69 g (0.057 mol) of 3,5-diaminobenzoic acid (3,5-DABA) was added to the BTDA diester solution and stirring was performed for 1 h while again heating to 50° C. to prepare a monomeric polyimide precursor solution.

Further, in Example 1-9, a silicon oxide (SiO) powder (product name: BP Powder, manufactured by Osaka Titanium Technologies Co., Ltd.) having a median diameter of 5.2 μm was used instead of the silicon powder as the active material particles. The composition ratio of Si and O in the used SiO powder was Si:O=1:1.05. Further, commercially available sodium polyacrylate (product name: Aqualic (registered trademark), product number: DL522, molecular weight: 170,000, manufactured by Nippon Shokubai Co., Ltd.) was used instead of sodium polyacrylate (molecular weight: 50,000) of Example 1-1 as the aqueous binder used for fabricating the negative electrode. Except for this, a battery was fabricated in the same manner as in Example 1-1. The charge-discharge cycle characteristic of the battery was measured in the same manner as in Example 1-1, except that the charge-discharge rate was set to 0.2C.

The solid fraction ratio (% by mass) of each material in the polyimide-coated active material particles obtained in this Example is shown in Table 2. The solid fraction ratio (% by mass) of each composition in the slurry for a negative electrode material obtained in this Example is shown in Table 2. Further, the solid fraction ratio (% by mass) of each material in the negative electrode obtained in this Example is shown in Table 3. As shown in Table 3, the relative ratio of the retention rate of the lithium secondary battery of Example 1-9 to the retention rate of the lithium secondary battery of Example 1-7 was 0.925.

Example 1-10

In Example 1-10, 2,4,6-triaminopyrimidine (TAP) was used instead of metaphenylenediamine (MPDA) of Example 1-1 as the polyamine compound included in the monomeric polyimide precursor solution. A BTDA diester solution was prepared by loading 35.7 g (0.111 mol) of 3,3',4,4'-benzophenonetetracarboxylic acid dianhydride (BTDA) (manufactured by Daicel Chemical Industries, Ltd.), 10.22 g (0.22 mol) of ethanol (manufactured by Ueno Chemical Industries Ltd.), and 44.78 g of N-methyl-2-pyrrolidone so that the solid fraction of the polyimide precursor solution was 45.0%, and then stirring the contents of the synthesis vessel for 1 h while heating at 90° C. After cooling the BTDA diester solution to 45° C. or less, 9.25 g (0.074 mol) of 2,4,6-triaminopyrimidine (TAP) was added to the BTDA diester solution and stirring was performed for 1 h while again heating to 50° C. to prepare a monomeric polyimide precursor solution.

Further, in Example 1-10, a silicon oxide (SiO) powder (product name: BP Powder, manufactured by Osaka Titanium Technologies Co., Ltd.) having a median diameter of 5.2 μm was used instead of the silicon powder as the active material particles. The composition ratio of Si and O in the used SiO powder was Si:O=1:1.05. Further, commercially available sodium polyacrylate (product name: Aqualic (registered trademark), product number: DL522, molecular weight: 170,000, manufactured by Nippon Shokubai Co., Ltd.) was used instead of sodium polyacrylate (molecular weight: 50,000) of Example 1-1 as the aqueous binder used for fabricating the negative electrode. Except for this, a battery was fabricated in the same manner as in Example 1-1. The charge-discharge cycle characteristic of the battery was measured in the same manner as in Example 1-1, except that the charge-discharge rate was set to 0.2C.

The solid fraction ratio (% by mass) of each material in the polyimide-coated active material particles obtained in this Example is shown in Table 2. The solid fraction ratio (% by mass) of each composition in the slurry for a negative electrode material obtained in this Example is shown in Table 2. Further, the solid fraction ratio (% by mass) of each material in the negative electrode obtained in this Example is shown in Table 3. As shown in Table 3, the relative ratio of the retention rate of the lithium secondary battery of Example 1-10 to the retention rate of the lithium secondary battery of Example 1-7 was 1.106.

Example 1-11

In Example 1-11, a polymeric polyimide precursor was added to the monomeric polyimide precursor solution. More specifically, a polyamic acid obtained by polymerizing BTDA and MPDA as raw materials was used. The mass ratio of the monomeric polyimide precursor and the polymeric polyimide precursor contained in the polyimide precursor solution (slurry) for coating was 75:25. Except for this, a battery was fabricated in the same manner as in Example 1-1, and the charge-discharge cycle characteristic of the battery was measured in the same manner as in Example 1-1.

The solid fraction ratio (% by mass) of each material in the polyimide-coated active material particles obtained in this Example is shown in Table 2. The solid fraction ratio (% by mass) of each composition in the slurry for a negative electrode material obtained in this Example is shown in Table 2. Further, the solid fraction ratio (% by mass) of each material in the negative electrode obtained in this Example is shown in Table 3. As shown in Table 3, the relative ratio of the retention rate of the lithium secondary battery of Example 1-11 to the retention rate of the lithium secondary battery of Example 1-7 was 0.613.

Example 1-12

In Example 1-12, a polymeric polyimide precursor was added to the monomeric polyimide precursor solution. More specifically, a polyamic acid obtained by polymerizing BTDA and MPDA as raw materials was used. The mass ratio of the monomeric polyimide precursor and the polymeric polyimide precursor contained in the polyimide precursor solution (slurry) for coating was 50:50. Except for this, a battery was fabricated in the same manner as in Example 1-1, and the charge-discharge cycle characteristic of the battery was measured in the same manner as in Example 1-1.

The solid fraction ratio (% by mass) of each material in the polyimide-coated active material particles obtained in this Example is shown in Table 2. The solid fraction ratio (% by mass) of each composition in the slurry for a negative electrode material obtained in this Example is shown in Table 2. Further, the solid fraction ratio (% by mass) of each material in the negative electrode obtained in this Example is shown in Table 3. As shown in Table 3, the relative ratio of the retention rate of the lithium secondary battery of Example 1-12 to the retention rate of the lithium secondary battery of Example 1-7 was 0.562.

Example 1-13

In Example 1-13, a silicon oxide (SiO) powder (product name: BP Powder, manufactured by Osaka Titanium Technologies Co., Ltd.) having a median diameter of 5.2 μm was used instead of the silicon powder as the active material particles. In addition to the silicon oxide powder, a carbon powder (purity 98.8%) (manufactured by Ito Graphite Co., Ltd.) was also used. The mass ratio of the silicon oxide powder and the carbon powder was 30:70. Coating with the polyimide precursor solution (slurry) was performed only on the silicon oxide powder. Carboxymethyl cellulose (CMC) was used instead of the sodium polyacrylate of Example 1-1 as an aqueous binder used for fabricating the negative electrode. Further, in Example 1-13, the amounts of the aqueous binder (CMC) and Ketjen black used for fabricating the negative electrode were changed. The solid fraction ratio (% by mass) of each composition in the slurry for a negative electrode material used in Example 1-13 is as shown in Table 2. Except for this, a battery was fabricated in the same manner as in Example 1-1, and the charge-discharge cycle characteristic of the battery was measured in the same manner as in Example 1-1.

The solid fraction ratio (% by mass) of each material in the polyimide-coated active material particles obtained in this Example is shown in Table 2. Further, the solid fraction ratio (% by mass) of each material in the negative electrode obtained in this Example is shown in Table 3. As shown in Table 3, the relative ratio of the retention rate of the lithium secondary battery of Example 1-13 to the retention rate of the lithium secondary battery of Example 1-7 was 1.034.

Comparative Examples to the above Example will be described below.

Comparative Example 1-1

In Comparative Example 1-1, a negative electrode was fabricated by using active material particles not coated with a polyimide instead of the polyimide-coated active material particle produced in Example 1-1. The active material particles used were a silicon powder (product name: Silgrain (registered trademark) e-Si, manufactured by Elkem AS) having a median diameter of 2.13 μm. In Comparative Example 1-1, the amount of Ketjen black used for fabricating the negative electrode was changed. The solid fraction ratio (% by mass) of each composition in the slurry for a negative electrode material used in Comparative Example 1-1 is as shown in Table 2. Except for this, a battery was fabricated in the same manner as in Example 1-1, and the charge-discharge cycle characteristic of the battery was measured in the same manner as in Example 1-1.

The solid fraction ratio (% by mass) of each material in the negative electrode obtained in this Comparative Example is shown in Table 3. As shown in Table 3, the relative ratio of the retention rate of the lithium secondary battery of Comparative Example 1-1 to the retention rate of the lithium secondary battery of Example 1-7 was 0.089.

Comparative Example 1-2

In Comparative Example 1-2, a negative electrode was fabricated by using active material particles not coated with a polyimide instead of the polyimide-coated active material particle produced in Example 1-4. The active material particles used were a silicon powder (product name: Silgrain (registered trademark) e-Si, manufactured by Elkem AS) having a median diameter of 2.13 μm. The solid fraction ratio (% by mass) of each composition in the slurry for a negative electrode material used in Comparative Example 1-2 is as shown in Table 2. Except for this, a battery was fabricated in the same manner as in Example 1-4, and the charge-discharge cycle characteristic of the battery was measured in the same manner as in Example 1-1, except that the charge-discharge rate was 0.2C.

The solid fraction ratio (% by mass) of each material in the negative electrode obtained in this Comparative Example is shown in Table 3. As shown in Table 3, the relative ratio of the retention rate of the lithium secondary battery of Comparative Example 1-2 to the retention rate of the lithium secondary battery of Example 1-7 was 0.014.

Comparative Example 1-3

In Comparative Example 1-3, a silicon oxide (SiO) powder was used instead of the silicon powder which was used in in Comparative Example 1-1 and was not coated with a polyimide. The composition ratio of Si and O in the used SiO powder was Si:O=1:1.05. The solid fraction ratio (% by mass) of each composition in the slurry for a negative electrode material used in Comparative Example 1-3 is as shown in Table 2. Except for this, a battery was fabricated in the same manner as in Comparative Example 1-1, and the charge-discharge cycle characteristic of the battery was measured in the same manner as in Example 1-1.

The solid fraction ratio (% by mass) of each material in the negative electrode obtained in this Comparative Example is shown in Table 3. As shown in Table 3, the relative ratio of the retention rate of the lithium secondary battery of Comparative Example 1-3 to the retention rate of the lithium secondary battery of Example 1-7 was 0.246.

Comparative Example 1-4

In Comparative Example 1-4, a negative electrode was fabricated by using active material particles not coated with a polyimide instead of the polyimide-coated active material particles produced in Example 1-8. The active material particles used were a silicon powder (product name: Silgrain (registered trademark) e-Si, manufactured by Elkem AS) having a median diameter of 2.13 µm. In Comparative Example 1-4, the amount of Ketjen black used for fabricating the negative electrode was changed. The solid fraction ratio (% by mass) of each composition in the slurry for a negative electrode material used in Comparative Example 1-4 is as shown in Table 2. Except for this, a battery was fabricated in the same manner as in Example 1-1, and the charge-discharge cycle characteristic of the battery was measured in the same manner as in Example 1-1.

The solid fraction ratio (% by mass) of each material in the negative electrode obtained in this Comparative Example is shown in Table 3. As shown in Table 3, the relative ratio of the retention rate of the lithium secondary battery of Comparative Example 1-4 to the retention rate of the lithium secondary battery of Example 1-7 was 0.065.

Comparative Example 1-5

In Comparative Example 1-5, a negative electrode was fabricated using polyimide-coated active material particles which were coated with a polymeric polyimide precursor solution instead of the polyimide-coated active material particles produced in Example 1-1. Thus, in this Comparative Example, the active material particles were coated only with the polymeric polyimide precursor solution, without including the monomeric polyimide precursor in the coating. Specifically, a polymeric polyimide precursor solution including a polyamic acid obtained by polymerizing BTDA and MPDA as raw materials was prepared. Polyimide-coated active material particles were prepared using the polymeric polyimide precursor solution. The solid fraction ratio (% by mass) of each composition in the slurry for a negative electrode material used in Comparative Example 1-5 is as shown in Table 2. Except for this, a battery was fabricated in the same manner as in Example 1-1, and the charge-discharge cycle characteristic of the battery was measured in the same manner as in Example 1-1.

The solid fraction ratio (% by mass) of each material in the polyimide-coated active material particles obtained in this Comparative Example is shown in Table 2. Further, the solid fraction ratio (% by mass) of each material in the negative electrode obtained in this Comparative Example is shown in Table 3. As shown in Table 3, the relative ratio of the retention rate of the lithium secondary battery of Comparative Example 1-5 to the retention rate of the lithium secondary battery of Example 1-7 was 0.460.

Comparative Example 1-6

In Comparative Example 1-6, a negative electrode was fabricated using polyimide-coated active material particles coated with a polymeric polyimide precursor solution in the same manner as in Comparative Example 1-5. Specifically, a monomeric polyimide precursor solution including a polyamic acid obtained by polymerizing PMDA and ODA as raw materials was prepared. Polyimide-coated active material particles were prepared using the monomeric polyimide precursor solution. The solid fraction ratio (% by mass) of each composition in the slurry for a negative electrode material used in Comparative Example 1-6 is as shown in Table 2. Except for this, a battery was fabricated in the same manner as in Example 1-1, and the charge-discharge cycle characteristic of the battery was measured in the same manner as in Example 1-1.

The solid fraction ratio (% by mass) of each material in the polyimide-coated active material particles obtained in this Comparative Example is shown in Table 2. Further, the solid fraction ratio (% by mass) of each material in the negative electrode obtained in this Comparative Example is shown in Table 3. As shown in Table 3, the relative ratio of the retention rate of the lithium secondary battery of Comparative Example 1-6 to the retention rate of the lithium secondary battery of Example 1-7 was 0.136.

Comparative Example 1-7

In Comparative Example 1-7, a negative electrode was fabricated using active material particles coated with carbon instead of active material particles not coated with a polyimide coating which were used in Comparative Example 1-1. Specifically, a silicon oxide (SiO) powder (manufactured by Osaka Titanium Technologies Co., Ltd, product name: CC Powder) having a median diameter of 5.4 µm and coated with carbon on the surface thereof was used as the active material particles. The solid fraction ratio (% by mass) of each composition in the slurry for a negative electrode material used in Comparative Example 1-7 is as shown in Table 2. Except for this, a battery was fabricated in the same manner as in Example 1-1, and the charge-discharge cycle characteristic of the battery was measured in the same manner as in Example 1-1.

The solid fraction ratio (% by mass) of each material in the polyimide-coated active material particles obtained in this Comparative Example is shown in Table 2. Further, the solid fraction ratio (% by mass) of each material in the negative electrode obtained in this Comparative Example is shown in Table 3. As shown in Table 3, the relative ratio of the retention rate of the lithium secondary battery of Comparative Example 1-7 to the retention rate of the lithium secondary battery of Example 1-7 was 0.079.

Described below are reference examples using a water-insoluble polyimide resin as a binder which is a material of the negative electrode.

Reference Example 1-1

In Reference Example 1-1, a negative electrode was fabricated using active material particles not coated with a polyimide instead of the polyimide-coated active material particles produced in Example 1-1. The active material particles used were a silicon powder (product name: Silgrain (registered trademark) e-Si, manufactured by Elkem AS) having a median diameter of 2.13 μm.

In Reference Example 1-1, a monomeric polyimide precursor solution was prepared in the same manner as in "1. Preparation of Monomeric Polyimide Precursor Solution" in Example 1-1. Then, 1.86 g of the above-mentioned active material particles, 0.093 g of Ketjen black (manufactured by Lion Corporation) and 0.023 g of vapor-grown carbon fibers (VGCF) (manufactured by Showa Denko K.K.) were added to 1 g of the obtained monomeric polyimide precursor solution to prepare a slurry for a negative electrode material. The solid fraction ratio (% by mass) of each composition in the slurry for a negative electrode material used in Reference Example 1-1 is as shown in Table 2. Except for this, a battery was fabricated in the same manner as in Example 1-1, and the charge-discharge cycle characteristic of the battery was measured in the same manner as in Example 1-1.

The solid fraction ratio (% by mass) of each material in the polyimide-coated active material particles obtained in this Reference Example is shown in Table 2. Further, the solid fraction ratio (% by mass) of each material in the negative electrode obtained in this Reference Example is shown in Table 3. As shown in Table 3, the relative ratio of the retention rate of the lithium secondary battery of Reference Example 1-1 to the retention rate of the lithium secondary battery of Example 1-7 was 1.079.

Reference Example 1-2

In Reference Example 1-2, a silicon oxide (SiO) powder (product name: BP Powder, manufactured by Osaka Titanium Technologies Co., Ltd.) having a median diameter of 5.2 μm was used instead of the silicon powder not coated with a polyimide which was used in Reference Example 1-1. The composition ratio of Si and O in the used SiO powder was Si:O=1:1.05. The solid fraction ratio (% by mass) of each composition in the slurry for a negative electrode material used in Reference Example 1-2 is as shown in Table 2. Except for this, a battery was fabricated in the same manner as in Reference Example 1-1. Then, the charge-discharge cycle characteristic of the battery was measured in the same manner as in Example 1-1, except that the charge-discharge rate was 0.2C.

The solid fraction ratio (% by mass) of each material in the polyimide-coated active material particles obtained in this Reference Example is shown in Table 2. Further, the solid fraction ratio (% by mass) of each material in the negative electrode obtained in this Reference Example is shown in Table 3. As shown in Table 3, the relative ratio of the retention rate of the lithium secondary battery of Reference Example 1-2 to the retention rate of the lithium secondary battery of Example 1-7 was 1.455.

The results of the above Examples, Comparative Examples, and Reference Examples are shown in the following Tables 1 to 3.

TABLE 1

| | | Types of materials | |
| --- | --- | --- | --- |
| Example No. | Active material | Coating on active material particles | Binder in electrode material |
| Example 1-1 | Si | BTDA/m-PDA (monomeric) | Sodium polyacrylate (product number: DL453) |
| Example 1-2 | Si | BTDA/m-PDA (monomeric) | Sodium polyacrylate (product number: DL453) |
| Example 1-3 | Si | BTDA/m-PDA (monomeric) | Sodium polyacrylate (product number: DL453) |
| Example 1-4 | Si + C | BTDA/m-PDA (monomeric) | SBR + CMC |
| Example 1-5 | SiO | BTDA/m-PDA (monomeric) | Sodium polyacrylate (product number: DL453) |
| Example 1-6 | SiO | BTDA/m-PDA (monomeric) | Sodium polyacrylate (product number: DL453) |
| Example 1-7 | SiO | BTDA/m-PDA (monomeric) | Sodium polyacrylate (product number: DL522) |
| Example 1-8 | Si | BTDA/m-PDA (monomeric) | CMC |
| Example 1-9 | SiO | BTDA/3,5-DABA (monomeric) | Sodium polyacrylate (product number: DL522) |
| Example 1-10 | SiO | BTDA/TAP (monomeric) | Sodium polyacrylate (product number: DL522) |

TABLE 1-continued

| | Types of materials | | |
|---|---|---|---|
| Example No. | Active material | Coating on active material particles | Binder in electrode material |
| Example 1-11 | Si | Polymeric: monomeric = 25: 75 | Sodium polyacrylate (product number: DL453) |
| Example 1-12 | Si | Polymeric: monomeric = 50: 50 | Sodium polyacrylate (product number: DL453) |
| Example 1-13 | SiO + C | BTDA/m-PDA (monomeric) | CMC |
| Comparative Example 1-1 | Si | None | Sodium polyacrylate (product number: DL453) |
| Comparative Example 1-2 | Si + C | None | SBR + CMC |
| Comparative Example 1-3 | SiO | None | Sodium polyacrylate (product number: DL453) |
| Comparative Example 1-4 | Si | None | CMC |
| Comparative Example 1-5 | Si | Polyamic acid of BTDA/m-PDA (polymeric) | Sodium polyacrylate (product number: DL453) |
| Comparative Example 1-6 | Si | Polyamic acid of PMDA/ODA | Sodium polyacrylate (product number: DL453) |
| Comparative Example 1-7 | SiO | Carbon coat (CC Powder) | Sodium polyacrylate (product number: DL453) |
| Reference Example 1-1 | Si | None | BTDA/m-PDA (monomeric) |
| Reference Example 1-2 | SiO | None | BTDA/m-PDA (monomeric) |

TABLE 2

| | Solid fraction ratio of active material particles (including coating) [wt %] | | | | Solid fraction ratio of slurry for electrode material [wt %] | | | | |
|---|---|---|---|---|---|---|---|---|---|
| | | Electrically conductive additive | | Binder for coating | Active material | Active material | Electrically conductive additive | | |
| Example | Active material | KB | VGCF | | Si/SiO | C | KB | VGCF | Binder |
| Example 1-1 | 80.00 | 4.00 | 1.00 | 15.00 | 87.00 | 0 | 3.00 | 0 | 10.00 |
| Example 1-2 | 75.00 | 8.00 | 2.00 | 15.00 | 87.00 | 0 | 3.00 | 0 | 10.00 |
| Example 1-3 | 72.50 | 4.00 | 1.00 | 22.50 | 87.00 | 0 | 3.00 | 0 | 10.00 |
| Example 1-4 | 80.00 | 4.00 | 1.00 | 15.00 | 29.25 | 68.25 | 0 | 0 | 2.50 |
| Example 1-5 | 80.00 | 4.00 | 1.00 | 15.00 | 87.00 | 0 | 3.00 | 0 | 10.00 |
| Example 1-6 | 80.00 | 4.00 | 1.00 | 15.00 | 87.00 | 0 | 3.00 | 0 | 10.00 |
| Example 1-7 | 80.00 | 4.00 | 1.00 | 15.00 | 87.00 | 0 | 3.00 | 0 | 10.00 |
| Example 1-8 | 80.00 | 4.00 | 1.00 | 15.00 | 63.00 | 0 | 17.00 | 0 | 20.00 |
| Example 1-9 | 80.00 | 4.00 | 1.00 | 15.00 | 87.00 | 0 | 3.00 | 0 | 10.00 |
| Example 1-10 | 80.00 | 4.00 | 1.00 | 15.00 | 87.00 | 0 | 3.00 | 0 | 10.00 |
| Example 1-11 | 80.00 | 4.00 | 1.00 | 15.00 | 87.00 | 0 | 3.00 | 0 | 10.00 |
| Example 1-12 | 80.00 | 4.00 | 1.00 | 15.00 | 87.00 | 0 | 3.00 | 0 | 10.00 |
| Example 1-13 | 80.00 | 4.00 | 1.00 | 15.00 | 24.00 | 56.00 | 0 | 0 | 20.00 |
| Comparative Example 1-1 | 100.00 | 0 | 0 | 0 | 83.00 | 0 | 7.00 | 0 | 10.00 |
| Comparative Example 1-2 | 100.00 | 0 | 0 | 0 | 29.25 | 68.25 | 0 | 0 | 2.50 |
| Comparative Example 1-3 | 100.00 | 0 | 0 | 0 | 83.00 | 0 | 7.00 | 0 | 10.00 |
| Comparative Example 1-4 | 100.00 | 0 | 0 | 0 | 60.00 | 0 | 20.00 | 0 | 20.00 |
| Comparative Example 1-5 | 80.00 | 4.00 | 1.00 | 15.00 | 87.00 | 0 | 3.00 | 0 | 10.00 |
| Comparative Example 1-6 | 80.00 | 4.00 | 1.00 | 15.00 | 87.00 | 0 | 3.00 | 0 | 10.00 |
| Comparative Example 1-7 | 100.00 | 0 | 0 | 0 | 83.00 | 0 | 7.00 | 0 | 10.00 |
| Reference Example 1-1 | 100.00 | 0 | 0 | 0 | 80.00 | 0 | 4.00 | 1.00 | 20.00 |
| Reference Example 1-2 | 100.00 | 0 | 0 | 0 | 80.00 | 0 | 4.00 | 1.00 | 15.00 |

TABLE 3

| Example | Solid fraction ratio in negative electrode [wt %] | | | | | | | Test conditions | Cycle characteristic Relative ratio with reference retention rate |
|---|---|---|---|---|---|---|---|---|---|
| | Active material | Elec. cond. additive | Binder | PI | PAA | SBR | CMC | | |
| Example 1-1 | 69.60 | 7.35 | 23.05 | 13.05 | 10.00 | 0 | 0 | 0.1 C | 0.804 |
| Example 1-2 | 65.25 | 11.70 | 23.05 | 13.05 | 10.00 | 0 | 0 | 0.1 C | 0.855 |
| Example 1-3 | 63.08 | 7.35 | 29.58 | 20.48 | 9.10 | 0 | 0 | 0.1 C | 1.049 |
| Example 1-4 | 91.65 | 1.46 | 6.89 | 4.39 | 0 | 1.50 | 1.00 | 0.2 C | 0.963 |
| Example 1-5 | 69.60 | 7.35 | 23.05 | 13.05 | 10.00 | 0 | 0 | 0.1 C | 1.051 |
| Example 1-6 | 69.60 | 7.35 | 23.05 | 13.05 | 10.00 | 0 | 0 | 0.2 C | 0.884 |
| Example 1-7 | 69.60 | 7.35 | 23.05 | 13.05 | 10.00 | 0 | 0 | 0.2 C | 1.000 |
| Example 1-8 | 50.40 | 20.15 | 29.45 | 9.45 | 0 | 0 | 20.00 | 0.1 C | 0.465 |
| Example 1-9 | 69.60 | 7.35 | 23.05 | 13.05 | 10.00 | 0 | 0 | 0.2 C | 0.925 |
| Example 1-10 | 69.60 | 7.35 | 23.05 | 13.05 | 10.00 | 0 | 0 | 0.2 C | 1.106 |
| Example 1-11 | 69.60 | 7.35 | 23.05 | 13.05 | 10.00 | 0 | 0 | 0.1 C | 0.613 |
| Example 1-12 | 69.60 | 7.35 | 23.05 | 13.05 | 10.00 | 0 | 0 | 0.1 C | 0.562 |
| Example 1-13 | 75.20 | 1.20 | 23.60 | 3.60 | 0 | 0 | 20.00 | 0.1 C | 1.034 |
| Comparative Example 1-1 | 83.00 | 7.00 | 10.00 | 0 | 10.00 | 0 | 0 | 0.1 C | 0.089 |
| Comparative Example 1-2 | 97.50 | 0 | 2.50 | 0 | 0 | 1.50 | 1.00 | 0.2 C | 0.014 |
| Comparative Example 1-3 | 83.00 | 7.00 | 10.00 | 0 | 10.00 | 0 | 0 | 0.1 C | 0.246 |
| Comparative Example 1-4 | 60.00 | 20.00 | 20.00 | 0 | 0 | 0 | 20.00 | 0.1 C | 0.065 |
| Comparative Example 1-5 | 69.60 | 7.35 | 23.05 | 13.05 | 10.00 | 0 | 0 | 0.1 C | 0.460 |
| Comparative Example 1-6 | 69.60 | 7.35 | 23.05 | 13.05 | 10.00 | 0 | 0 | 0.1 C | 0.136 |
| Comparative Example 1-7 | 83.00 | 7.00 | 10.00 | 0 | 10.00 | 0 | 0 | 0.1 C | 0.079 |
| Reference Example 1-1 | 80.00 | 5.00 | 20.00 | 20.00 | 0 | 0 | 0 | 0.1 C | 1.079 |
| Reference Example 1-2 | 80.00 | 5.00 | 15.00 | 15.00 | 0 | 0 | 0 | 0.2 C | 1.455 |

(Calculation of Ratio of Charge-Discharge Cycle Characteristic to Reference Value (Reference Example))

The ratio of retention rates was then determined with reference to the retention rate (%) of a battery equipped with a negative electrode having an active material layer using a polyimide as a binder on the basis of the results on the charge-discharge cycle characteristics measured in the above-mentioned Examples and Comparative Examples. Here, the results of Reference Example 1-1 and Reference Example 1-2 were used as retention rates of batteries taken as a reference. For Examples and Comparative Examples in which the charge-discharge cycle test was performed at the same charge-discharge rate of 0.1C as in Reference Example 1-1, the ratio of charge-discharge cycle characteristics was calculated using the retention rate (%) of Reference Example 1-1 as a reference value. For Examples and Comparative Examples in which the charge-discharge cycle test was performed at the same charge-discharge rate of 0.2C as in Reference Example 1-2, the ratio of charge-discharge cycle characteristics was calculated using the retention rate (%) of Reference Example 1-2 as a reference value. The results are shown in Table 4.

TABLE 4

| Example | Cycle characteristic | | Ratio of cycle characteristic with respect to reference example (%) | |
|---|---|---|---|---|
| | Test conditions (current value) | Relative ratio with reference retention rate | When charge-discharge rate is 0.1 C | When charge-discharge rate is 0.2 C |
| Example 1-1 | 0.1 C | 0.804 | 74.5 | — |
| Example 1-2 | 0.1 C | 0.855 | 79.2 | — |
| Example 1-3 | 0.1 C | 1.049 | 97.2 | — |
| Example 1-4 | 0.2 C | 0.963 | — | 66.2 |
| Example 1-5 | 0.1 C | 1.051 | 97.4 | — |
| Example 1-6 | 0.2 C | 0.884 | — | 60.8 |
| Example 1-7 | 0.2 C | 1.000 | — | 68.7 |
| Example 1-8 | 0.1 C | 0.465 | 43.1 | — |
| Example 1-9 | 0.2 C | 0.925 | — | 63.6 |
| Example 1-10 | 0.2 C | 1.106 | — | 76.0 |
| Example 1-11 | 0.1 C | 0.613 | 56.8 | — |
| Example 1-12 | 0.1 C | 0.562 | 52.1 | — |
| Example 1-13 | 0.1 C | 1.034 | 95.8 | — |
| Comparative Example 1-1 | 0.1 C | 0.089 | 8.2 | — |
| Comparative Example 1-2 | 0.2 C | 0.014 | — | 1.0 |
| Comparative Example 1-3 | 0.1 C | 0.246 | 22.8 | — |

TABLE 4-continued

| Example | Cycle characteristic | | Ratio of cycle characteristic with respect to reference example (%) | |
|---|---|---|---|---|
| | Test conditions (current value) | Relative ratio with reference retention rate | When charge-discharge rate is 0.1 C | When charge-discharge rate is 0.2 C |
| Comparative Example 1-4 | 0.1 C | 0.065 | 6.0 | — |
| Comparative Example 1-5 | 0.1 C | 0.460 | 42.6 | — |
| Comparative Example 1-6 | 0.1 C | 0.136 | 12.6 | — |
| Comparative Example 1-7 | 0.1 C | 0.079 | 7.3 | — |
| Reference Example 1-1 | 0.1 C | 1.079 | Reference value | — |
| Reference Example 1-2 | 0.2 C | 1.455 | — | Reference value |

As shown in Table 4, the ratio of the charge-discharge cycle characteristics in the Examples was 43.0% or more with respect to the reference value. By contrast, the ratio of the charge-discharge cycle characteristics in the Comparative Examples was less than 43.0% with respect to the reference value.

From the results of the above Examples, it was confirmed that the negative electrode including the active material particles coated with the polyimide layer derived from the monomeric polyimide precursor, and the aqueous binder could improve the charge-discharge cycle characteristic as compared with that obtained when uncoated active material particles were used (Comparative Examples 1-1 to 1-4). It was also confirmed that the active material particles coated with the polyimide layer derived from the monomeric polyimide precursor could improve the charge-discharge cycle characteristic as compared with that obtained when the active material particles coated with the polyimide layer derived from the polymeric polyimide precursor were used (Comparative Example 1-5). Furthermore, it was confirmed that when active material particles coated with a polyimide layer derived from a monomeric polyimide precursor were used, even when a negative electrode was fabricated using an aqueous binder, a problem-free charge-discharge cycle characteristic could be maintained on the same level as that obtained when a polyimide was used as the binder for the electrode (Reference Example).

Example 2

In Example 2, the polyimide-coated active material particles prepared in the above-described Examples 1-1 and 1-12 and Comparative Example 1-5 were subjected to Auger electron spectroscopic analysis to confirm the surface state of the particles.

For Auger electron spectroscopic analysis, an Auger spectroscopic apparatus PHI-700 (manufactured by ULVAC-PHI, Inc.) was used. The analysis conditions were as follows.

Acceleration voltage/current: 10 kV, 10 nA
Measured energy range: 30 to 2000 eV
Measuring step: 1.0 eV
Ar sputtering conditions: 2 kV, 2 mm×2 mm region
Sputtering rate: 7.23 nm/min (converted to $SiO_2$)

Figure 3:
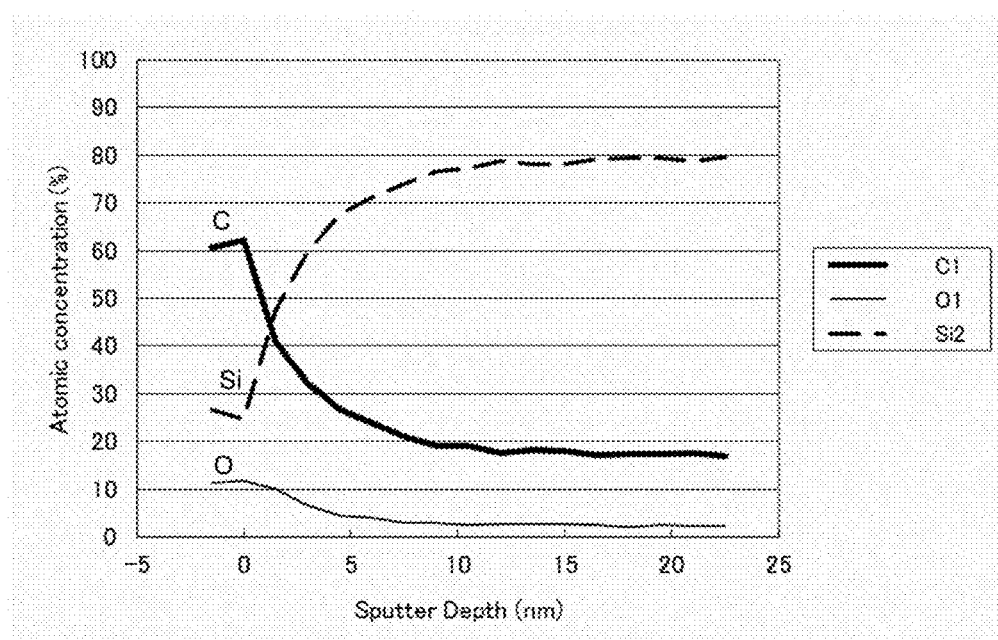
FIG. 3(a) is a graph showing the results of depth analysis of a polyimide-coated active material particle of Example 1-1 with an Auger spectroscopic device.
FIG. 3(b) is an image obtained by photographing the state of the polyimide-coated active material particle of Example 1-1.
Figure 3:
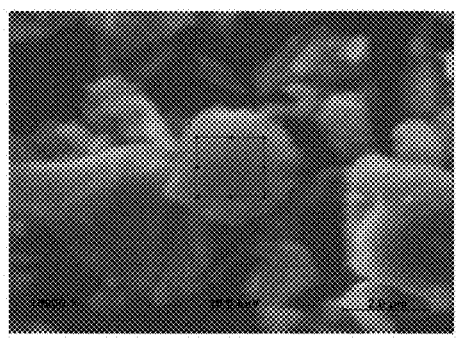
Figure 4:
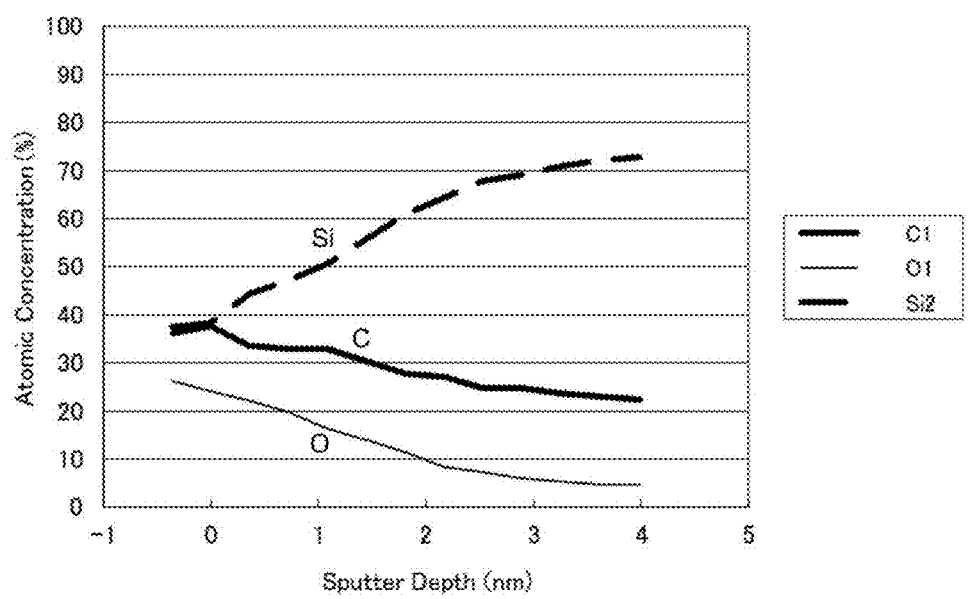
FIG. 4(a) is a graph showing the results of depth analysis of a polyimide-coated active material particle of Example 1-12 by an Auger spectroscopic device and FIG. 4(b) is an image obtained by photographing the state of the polyimide-coated active material particle of Example 1-12.
Figure 4:
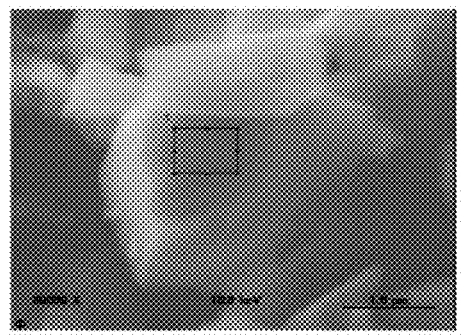
Figure 5:
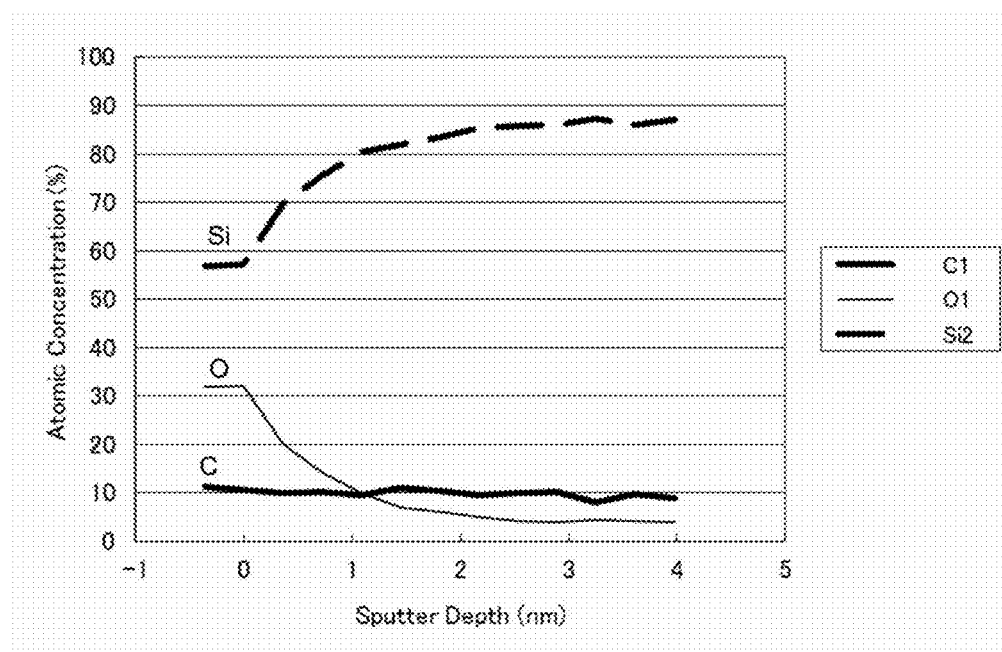
FIG. 5(a) is a graph showing the results of depth analysis of polyimide-coated active material particle of Comparative Example 1-5 with an Auger spectroscopic device and FIG. 5(b) is an image obtained by photographing the state of the polyimide-coated active material particle of Comparative Example 1-5.
Figure 5:
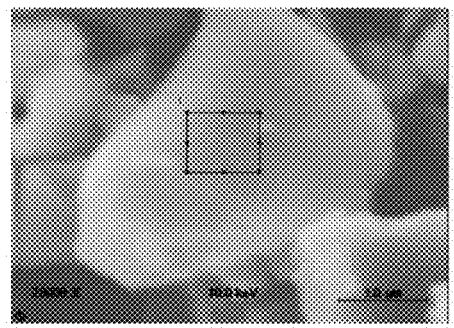

FIG. 3 shows the analysis results relating to the polyimide-coated active material particle of Example 1-1. FIG. 3(a) is a graph showing the results of depth analysis of the particle. FIG. 3(b) is an image obtained by photographing the state of the particle. FIG. 4 shows the analysis results relating to the polyimide-coated active material particle of Example 1-12. FIG. 4(a) is a graph showing the results of depth analysis of the particle. FIG. 4(b) is an image obtained by photographing the state of the particle. FIG. 5 shows the analysis results relating to the polyimide-coated active material particle of Comparative Example 1-5. FIG. 5(a) is a graph showing the results of depth analysis of the particle. FIG. 5(b) is an image obtained by photographing the state of the particle.

From these results, it was found that the amount of Si component detected on the surface side increased with the increase in the amount of the component derived from the polymeric polyimide precursor in the coating. From this result, it is presumed that the active material particles (Si) are more likely to be exposed on the surface side as the amount of the polymeric-derived component in the coating increases.

Further, in the graphs of FIGS. 3(a), 4(a), and 5(a), the depth at which the concentration change of each component does not occur is apparently the thickness of the polyimide layer covering the active material particle. From the results shown in the figures, it is assumed that the thickness of the polyimide layer increased as the amount of the monomeric-derived component in the coating increased. Also, from the graphs of FIGS. 3(a) and 4(a), it was found that the C component was present at a constant concentration even after the concentration of the Si component stopped changing. It is conceivable from this result that where the active material particles are coated with a polyimide layer including a monomeric-derived component, the monomeric-derived component may enter fine gaps of the active material particles (Si).

From the above results, it was confirmed that there was a significant difference in the results of Auger electron spectroscopic analysis depending on the component ratio of the monomeric-derived component and the polymeric-derived component contained in the polyimide-coated active material particles.

REFERENCE SIGNS LIST

1 Battery
20 Active material layer
21 Polyimide-coated active material particles (negative electrode active material particles)
22 Aqueous binder
23 Active material particles
24 Polyimide layer
30 Current collector
100 Positive electrode
200 Negative electrode
300 Separator

The invention claimed is:
1. A slurry for an electrode material comprising:
a polyimide-coated active material particle; and
an aqueous binder,
wherein the polyimide-coated active material particle comprises:
an active material particle; and
a polyimide layer,
a polyimide in the polyimide layer is derived from a monomeric polyimide precursor in a polyimide precursor solution coated on the active material particle,
the polyimide layer has a porous structure, and the slurry provides a ratio (A)/(B) in a range of 43.0% or more, wherein the ratio (A)/(B) is a ratio of (A) a charge-discharge cycle characteristic of a battery having, in a negative electrode, an active material layer made of the slurry to (B) a charge-discharge cycle characteristic of a battery having, in a negative electrode, an active material layer made of the active material particle and the polyimide as a binder.

2. The slurry for an electrode material according to claim 1, wherein a thickness of the polyimide layer is in a range of 0.5 nm or more and 50 nm or less.

3. The slurry for an electrode material according to claim 1,
wherein the polyimide-coated active material particle comprises a C component in an surface portion of the polyimide-coated active material particle, the surface portion therein facing the polyimide layer, and
an amount of the C component in the surface portion is more than an amount of a Si component included in the surface portion of the polyimide-coated active material particle.

4. The slurry for an electrode material according to claim 1,
wherein the polyimide precursor solution further comprises at least one tetracarboxylic acid ester compound and at least one polyamine compound.

5. The slurry for an electrode material according to claim 1,
wherein the polyimide layer is derived from the polyimide precursor solution that further comprises a polymeric polyimide precursor, and
a mass ratio of the polymeric polyimide precursor relative to a total mass of the monomeric polyimide precursor and the polymeric polyimide precursor in the polyimide precursor solution is in a range of 0% or more and 50% or less.

6. The slurry for an electrode material according to claim 1,
wherein the aqueous binder is a polyacrylic acid, a styrene-butadiene rubber, carboxymethyl cellulose, or a mixture of at least two thereof.

7. The slurry for an electrode material according to claim 1, further comprising an electrically conductive additive.

8. A method for producing a slurry for an electrode material, the method comprising:
coating an active material particle with a polyimide precursor solution comprising a monomeric polyimide precursor;
heating the active material particle coated with the polyimide precursor solution comprising the monomeric polyimide precursor so as to form a polyimide-coated active material particle; and
adding the polyimide-coated active material particle to an aqueous binder so as to form the slurry,
wherein the polyimide layer formed by coating the active material particle with the polyimide precursor solution has a porous structure, and
the slurry provides a ratio (A)/(B) in a range of 43.0% or more, wherein the ratio (A)/(B) is a ratio of (A) a charge-discharge cycle characteristic of a battery having, in a negative electrode, an active material layer made of the slurry to (B) a charge-discharge cycle characteristic of a battery having, in a negative electrode, an active material layer made of the active material particle and the polyimide as a binder.

9. A polyimide-coated active material particle comprising:
an active material particle; and
a polyimide layer that is formed on the active material particle by coating a polyimide precursor solution comprising a monomeric polyimide precursor thereon, wherein the polyimide layer has a porous structure, and
the polyimide-coated active material particle provides a ratio (A)/(B) in a range of 43.0% or more, wherein the ratio (A)/(B) is a ratio of (A) a charge-discharge cycle characteristic of a battery having, in a negative electrode, an active material layer including the polyimide-coated active material particle and an aqueous binder to (B) a charge-discharge cycle characteristic of a battery having, in a negative electrode, an active material layer made of the active material particle and the polyimide as a binder.

10. The polyimide-coated active material particle according to claim 9, wherein a thickness of the polyimide layer is in a range of 0.5 nm or more and 50 nm or less.

11. The polyimide-coated active material particle according to claim 9,
wherein the polyimide precursor solution forming the polyimide layer further comprises at least one tetracarboxylic acid ester compound and at least one polyamine compound.

12. The polyimide-coated active material particle according to claim 9,
wherein the polyimide layer is derived from a polyimide precursor solution that further comprises a polymeric polyimide precursor, and
a mass ratio of the polymeric polyimide precursor relative to a total mass of the monomeric polyimide precursor and the polymeric polyimide precursor in the polyimide precursor solution is in a range of 0% or more and 50% or less.

13. A negative electrode comprising:
a current collector; and
an active material layer comprising the polyimide-coated active material particle according to claim 9 and an aqueous binder.

14. A battery comprising:
a positive electrode;
the negative electrode according to claim 13;
a separator disposed between the positive electrode and the negative electrode; and
an electrolyte-containing medium filled between the positive electrode and the negative electrode.

15. A slurry for an electrode material according to claim 1, wherein the polyimide precursor solution contains no polymeric polyimide precursor.

16. The slurry for an electrode material according to claim 1,
wherein the active material particle is a particle having a core-shell structure.

17. The slurry for an electrode material according to claim 16,
wherein a core portion of the active material particle having the core-shell structure comprises a particle comprising at least material selected from the group consisting of silicon oxide, silicon alloy, tin oxide, lead oxide, aluminum oxide, and zinc oxide.

18. The slurry for an electrode material according to claim 16,
wherein a core portion of the active material particle having the core-shell structure comprises a particle comprising silicon oxide, and a ratio of Si and O in the silicon oxide is 1:X, respectively, wherein X is in a range of more than 0 and less than 2.

19. The slurry for an electrode material according to claim 16, wherein a core portion of the active material particle comprises a particle of at least one material selected the group consisting of germanium, tin, lead, zinc, magnesium, sodium, aluminum, gallium, and indium, and alloys thereof.

20. The slurry for an electrode material according to claim 16, wherein a shell portion of the active material particle having the core-shell structure comprises (i) one or more metals selected from the group consisting of copper, nickel, iron, titanium, and cobalt, (ii) an alloy of a combination of two or more metals selected from the group consisting of copper, nickel, iron, titanium, and cobalt, or (iii) a silane coupling agent.

* * * * *